(12) United States Patent
Yoshida et al.

(10) Patent No.: US 9,403,578 B1
(45) Date of Patent: Aug. 2, 2016

(54) BICYCLE SPROCKET ASSEMBLY AND BICYCLE REAR SPROCKET ASSEMBLY

(71) Applicant: SHIMANO INC., Sakai (JP)

(72) Inventors: Toyoshi Yoshida, Sakai (JP); Toshinari Oishi, Sakai (JP); Tsuyoshi Fukumori, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/615,364

(22) Filed: Feb. 5, 2015

(51) Int. Cl.
| | |
|---|---|
| *F16H 55/30* | (2006.01) |
| *F16H 7/06* | (2006.01) |
| *F16H 55/12* | (2006.01) |
| *F16H 55/06* | (2006.01) |
| *B62M 9/10* | (2006.01) |

(52) U.S. Cl.
CPC .................. *B62M 9/10* (2013.01); *F16H 55/06* (2013.01); *F16H 55/30* (2013.01); *F16H 2055/065* (2013.01)

(58) Field of Classification Search
CPC .......... B62M 9/10; B62M 9/105; B62M 9/12; F16H 55/30; F16D 41/30
USPC .......................................... 474/160, 161, 164
See application file for complete search history.

(56) References Cited

U.S. PATENT DOCUMENTS

| | | | | |
|---|---|---|---|---|
| 2,720,119 A | * | 10/1955 | Sherman .................. | F16H 55/16 264/262 |
| 4,009,621 A | * | 3/1977 | Segawa .................. | B62M 9/105 474/160 |
| 4,102,215 A | * | 7/1978 | Nagano .................... | F16D 41/24 192/64 |
| 4,121,474 A | * | 10/1978 | Arregui Suinaga ..... | F16D 41/30 474/160 |
| 4,145,095 A | * | 3/1979 | Segawa .................. | B60B 27/023 192/64 |
| 4,154,123 A | * | 5/1979 | Nagano .................... | B62M 9/10 192/64 |
| 4,296,850 A | * | 10/1981 | Isobe ....................... | B62M 9/10 192/64 |
| 4,299,318 A | * | 11/1981 | Segawa .................... | B62M 9/10 192/64 |
| 4,311,473 A | * | 1/1982 | Sugimoto ................ | B62M 9/10 192/64 |
| 4,318,310 A | * | 3/1982 | Segawa .................. | B62K 19/34 29/893.33 |
| 4,472,163 A | * | 9/1984 | Bottini ..................... | B62M 9/10 192/64 |
| 4,586,914 A | * | 5/1986 | Nagano .................. | B62M 9/105 474/160 |
| 4,639,241 A | * | 1/1987 | Monka ..................... | B62M 9/10 403/261 |

(Continued)

FOREIGN PATENT DOCUMENTS

EP         1342657         9/2003

*Primary Examiner* — Henry Liu
(74) *Attorney, Agent, or Firm* — Mori & Ward, LLP

(57) ABSTRACT

A bicycle sprocket assembly comprises a first sprocket, a second sprocket, a first intervening member, and a second intervening member. The first sprocket includes a first sprocket body and a first chain-engagement structure. The second sprocket includes a second sprocket body and a second chain-engagement structure. The first intervening member is positioned between the first sprocket and the second sprocket in an axial direction parallel to a rotational center axis. The second intervening member is positioned between the first sprocket and the second sprocket in the axial direction. The second intervening member is provided radially outwardly from the first intervening member with respect to the rotational center axis. The second intervening member is attached to at least one of the first sprocket and the second sprocket and has an elongated shape extending along a first reference plane perpendicular to the rotational center axis.

37 Claims, 26 Drawing Sheets

(56) References Cited

U.S. PATENT DOCUMENTS

| | | | | |
|---|---|---|---|---|
| 4,816,013 | A * | 3/1989 | Kapela | F16D 41/30 474/160 |
| 4,869,710 | A * | 9/1989 | Iwasaki | F16D 41/30 474/160 |
| 5,324,100 | A * | 6/1994 | James | B60B 27/023 192/64 |
| 5,480,357 | A * | 1/1996 | Liang | B62M 9/10 474/160 |
| 5,503,600 | A * | 4/1996 | Berecz | F16H 55/30 474/160 |
| 5,788,593 | A * | 8/1998 | Tiong | B62M 9/10 474/160 |
| 5,935,034 | A * | 8/1999 | Campagnolo | B62M 9/10 474/160 |
| 5,947,852 | A * | 9/1999 | Moretz | F16H 55/12 474/160 |
| 6,102,821 | A * | 8/2000 | Nakamura | B62M 9/10 474/160 |
| 6,247,555 | B1 * | 6/2001 | Millard | F16N 7/12 184/15.1 |
| 6,264,575 | B1 * | 7/2001 | Lim | F16D 41/30 192/64 |
| 6,293,884 | B1 * | 9/2001 | Chattin | B62M 9/10 474/158 |
| 6,488,603 | B2 * | 12/2002 | Lim | F16D 41/30 192/64 |
| 6,923,741 | B2 * | 8/2005 | Wei | B62M 9/10 474/152 |
| 7,004,867 | B2 * | 2/2006 | Wei | B62M 9/10 474/152 |
| 7,344,463 | B2 * | 3/2008 | Reiter | B62M 9/10 474/160 |
| 7,481,729 | B2 * | 1/2009 | Andel | F16H 55/06 474/162 |
| 7,503,864 | B2 * | 3/2009 | Nonoshita | B62M 9/105 474/160 |
| 7,585,240 | B2 * | 9/2009 | Kamada | B62M 9/10 474/148 |
| 7,824,287 | B2 * | 11/2010 | Nonoshita | B62M 9/10 474/152 |
| 7,850,564 | B2 * | 12/2010 | Nonoshita | B62M 9/105 474/152 |
| 7,967,709 | B2 * | 6/2011 | Emura | B62M 9/105 474/160 |
| 8,057,338 | B2 * | 11/2011 | Kamada | B62M 9/10 474/152 |
| 8,574,108 | B2 * | 11/2013 | Wang | F16H 55/06 474/152 |
| 8,696,503 | B2 * | 4/2014 | Oishi | B62M 9/10 474/160 |
| 8,821,330 | B2 * | 9/2014 | Dal Pra' | B62M 9/10 474/160 |
| 8,905,878 | B2 * | 12/2014 | Loy | B62M 9/10 474/160 |
| 9,011,282 | B2 * | 4/2015 | Staples | B62M 9/10 474/160 |
| 2001/0039224 | A1 * | 11/2001 | Lim | F16D 41/30 474/160 |
| 2003/0171180 | A1 * | 9/2003 | Shahana | B62M 9/10 474/152 |
| 2004/0043855 | A1 * | 3/2004 | Wei | B62M 9/10 474/160 |
| 2004/0142782 | A1 * | 7/2004 | Kamada | B60B 27/026 474/160 |
| 2004/0209721 | A1 * | 10/2004 | Chattin | B62M 9/10 474/160 |
| 2005/0032596 | A1 * | 2/2005 | Nonoshita | B62K 19/16 474/175 |
| 2005/0090349 | A1 * | 4/2005 | Lee | B62M 9/105 474/160 |
| 2005/0119080 | A1 * | 6/2005 | Wei | B62M 9/10 474/160 |
| 2005/0233850 | A1 * | 10/2005 | Andel | F16H 55/06 474/152 |
| 2005/0282672 | A1 * | 12/2005 | Nonoshita | B62M 9/105 474/161 |
| 2006/0128512 | A1 * | 6/2006 | Tetsuka | B62M 3/00 474/160 |
| 2006/0172840 | A1 * | 8/2006 | Kamada | B62M 9/10 474/152 |
| 2006/0205549 | A1 * | 9/2006 | Nonoshita | B62M 9/105 474/160 |
| 2006/0258499 | A1 * | 11/2006 | Kamada | B62M 9/12 474/160 |
| 2007/0054770 | A1 * | 3/2007 | Valle | B62M 9/10 474/160 |
| 2007/0129193 | A1 * | 6/2007 | Nonoshita | B62M 9/10 474/160 |
| 2007/0265122 | A1 * | 11/2007 | Emura | B62M 9/105 474/152 |
| 2008/0004143 | A1 * | 1/2008 | Kanehisa | B62M 9/10 474/160 |
| 2008/0058144 | A1 * | 3/2008 | Oseto | B62M 9/10 474/160 |
| 2009/0042679 | A1 * | 2/2009 | Valle | B62M 9/10 474/152 |
| 2009/0042682 | A1 * | 2/2009 | Dal Pra' | F16H 55/30 474/160 |
| 2009/0098966 | A1 * | 4/2009 | Kamada | B62M 9/10 474/160 |
| 2010/0009794 | A1 * | 1/2010 | Chiang | B62M 9/10 474/160 |
| 2010/0075791 | A1 | 3/2010 | Braedt | |
| 2010/0099530 | A1 * | 4/2010 | Chiang | B62M 9/10 474/160 |
| 2011/0053721 | A1 * | 3/2011 | Kamada | B62M 9/10 474/160 |
| 2011/0312457 | A1 * | 12/2011 | Wang | F16H 55/30 474/152 |
| 2012/0196711 | A1 * | 8/2012 | Loy | B62M 9/10 474/160 |
| 2012/0220402 | A1 * | 8/2012 | D'Aluisio | B62M 9/12 474/160 |
| 2012/0225745 | A1 * | 9/2012 | Oishi | B62M 9/10 474/160 |
| 2012/0244978 | A1 * | 9/2012 | Liao | B62M 9/10 474/160 |
| 2012/0277045 | A1 * | 11/2012 | Valle | B62M 9/10 474/156 |
| 2012/0322598 | A1 * | 12/2012 | Lin | B62M 9/10 474/160 |
| 2013/0017914 | A1 * | 1/2013 | Braedt | B62M 9/10 474/160 |
| 2013/0143704 | A1 * | 6/2013 | Blank | B62M 9/10 474/161 |
| 2014/0302956 | A1 * | 10/2014 | Dal Pr | B62M 9/10 474/160 |
| 2014/0335987 | A1 * | 11/2014 | Iwai | F16H 55/303 474/161 |
| 2015/0133249 | A1 * | 5/2015 | Tsai | B62M 9/12 474/160 |

* cited by examiner

BICYCLE SPROCKET ASSEMBLY AND BICYCLE REAR SPROCKET ASSEMBLY

BACKGROUND OF THE INVENTION

1. Field of the Invention

The present invention relates to a bicycle sprocket assembly and a bicycle rear sprocket assembly.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket assembly.

SUMMARY OF THE INVENTION

In accordance with a first aspect of the present invention, a bicycle sprocket assembly has a rotational center axis. The bicycle sprocket assembly comprises a first sprocket, a second sprocket, a first intervening member, and a second intervening member. The first sprocket includes a first sprocket body and a first chain-engagement structure configured to engage with a bicycle chain. The first sprocket body has a first hub engagement profile configured to engage with a bicycle hub assembly. The second sprocket includes a second sprocket body and a second chain-engagement structure configured to engage with the bicycle chain. The second sprocket body has a second hub engagement profile configured to engage with the bicycle hub assembly. The first intervening member is positioned between the first sprocket and the second sprocket in an axial direction parallel to the rotational center axis. The second intervening member is positioned between the first sprocket and the second sprocket in the axial direction. The second intervening member is provided radially outwardly from the first intervening member with respect to the rotational center axis. The second intervening member is attached to at least one of the first sprocket and the second sprocket and has an elongated shape extending along a first reference plane perpendicular to the rotational center axis.

In accordance with a second aspect of the present invention, the bicycle sprocket assembly according to the first aspect is configured so that the first intervening member has an annular shape.

In accordance with a third aspect of the present invention, the bicycle sprocket assembly according to the first aspect is configured so that the first intervening member is a separate member from the second intervening member.

In accordance with a fourth aspect of the present invention, the bicycle sprocket assembly according to the first aspect is configured so that the first sprocket is adjacent to the second sprocket without another sprocket intervening between the first sprocket and the second sprocket in the axial direction.

In accordance with a fifth aspect of the present invention, the bicycle sprocket assembly according to the first aspect is configured so that the first intervening member has a hub engagement profile configured to engage with the bicycle hub assembly.

In accordance with a sixth aspect of the present invention, the bicycle sprocket assembly according to the first aspect is configured so that the first intervening member and the second intervening member are spaced apart from each other in a radial direction with respect to the rotational center axis.

In accordance with a seventh aspect of the present invention, the bicycle sprocket assembly according to the first aspect is configured so that the first intervening member is attached to at least one of the first sprocket and the second sprocket by adhesive. The second intervening member is attached to at least one of the first sprocket and the second sprocket by adhesive.

In accordance with an eighth aspect of the present invention, the bicycle sprocket assembly according to the first aspect is configured so that the first intervening member is attached to at least one of the first sprocket and the second sprocket by diffusion bonding. The second intervening member is attached to at least one of the first sprocket and the second sprocket by diffusion bonding.

In accordance with a ninth aspect of the present invention, the bicycle sprocket assembly according to the first aspect is configured so that the first chain-engagement structure includes a plurality of first teeth having a first total number. The second chain-engagement structure includes a plurality of second teeth having a second total number. The first total number is larger than the second total number.

In accordance with a tenth aspect of the present invention, the bicycle sprocket assembly according to the first aspect is configured so that the first chain-engagement structure includes a first annular member and a plurality of first teeth circumferentially arranged on an outer periphery of the first annular member. The first annular member and the plurality of first teeth are made of a metallic material. The first sprocket body is made of a non-metallic material.

In accordance with an eleventh aspect of the present invention, the bicycle sprocket assembly according to the tenth aspect is configured so that the first sprocket body is made of a resin material.

In accordance with a twelfth aspect of the present invention, the bicycle sprocket assembly according to the tenth aspect is configured so that the first annular member is attached to the first sprocket body by integral molding.

In accordance with a thirteenth aspect of the present invention, the bicycle sprocket assembly according to the tenth aspect is configured so that the first annular member is attached to the first sprocket body by adhesive.

In accordance with a fourteenth aspect of the present invention, the bicycle sprocket assembly according to the first aspect is configured so that the second intervening member is integral with one of the first sprocket and the second sprocket as a single unitary member.

In accordance with a fifteenth aspect of the present invention, the bicycle sprocket assembly according to the first aspect is configured so that the second intervening member is attached to the first sprocket and the second sprocket.

In accordance with a sixteenth aspect of the present invention, the bicycle sprocket assembly according to the first aspect further comprises a third sprocket, a third intervening member, and a fourth intervening member. The third sprocket includes a third sprocket body and a third chain-engagement structure configured to engage with the bicycle chain. The third sprocket body has a third hub engagement profile configured to engage with the bicycle hub assembly. The second sprocket is positioned between the first sprocket and the third sprocket in the axial direction. The third intervening member is positioned between the second sprocket and the third sprocket in the axial direction. The fourth intervening member is positioned between the second sprocket and the third sprocket in the axial direction. The fourth intervening member is provided radially outwardly from the third intervening member with respect to the rotational center axis. The fourth intervening member is attached to at least one of the second sprocket and the third sprocket.

In accordance with a seventeenth aspect of the present invention, the bicycle sprocket assembly according to the sixteenth aspect is configured so that the fourth intervening member having an elongated shape extending along a second reference plane perpendicular to the rotational center axis.

In accordance with an eighteenth aspect of the present invention, the bicycle sprocket assembly according to the sixteenth aspect is configured so that the third intervening member has an annular shape.

In accordance with a nineteenth aspect of the present invention, the bicycle sprocket assembly according to the sixteenth aspect is configured so that the third intervening member is a separate member from the fourth intervening member.

In accordance with a twentieth aspect of the present invention, the bicycle sprocket assembly according to the sixteenth aspect is configured so that the second sprocket is adjacent to the third sprocket without another sprocket intervening between the second sprocket and the third sprocket in the axial direction.

In accordance with a twenty-first aspect of the present invention, the bicycle sprocket assembly according to the sixteenth aspect is configured so that the fourth intervening member is attached to the second sprocket and the third sprocket.

In accordance with a twenty-second aspect of the present invention, the bicycle sprocket assembly according to the sixteenth aspect is configured so that the third intervening member has a hub engagement profile configured to engage with the bicycle hub assembly.

In accordance with a twenty-third aspect of the present invention, the bicycle sprocket assembly according to the sixteenth aspect is configured so that the third intervening member and the fourth intervening member are spaced apart from each other in a radial direction with respect to the rotational center axis.

In accordance with a twenty-fourth aspect of the present invention, the bicycle sprocket assembly according to the sixteenth aspect is configured so that the fourth intervening member is positioned radially inwardly from the second intervening member with respect to the rotational center axis.

In accordance with a twenty-fifth aspect of the present invention, the bicycle sprocket assembly according to the sixteenth aspect is configured so that the third intervening member is attached to at least one of the second sprocket and the third sprocket by adhesive. The fourth intervening member is attached to at least one of the second sprocket and the third sprocket by adhesive.

In accordance with a twenty-sixth aspect of the present invention, the bicycle sprocket assembly according to the sixteenth aspect is configured so that the third intervening member is attached to at least one of the second sprocket and the third sprocket by diffusion bonding. The fourth intervening member is attached to at least one of the second sprocket and the third sprocket by diffusion bonding.

In accordance with a twenty-seventh aspect of the present invention, the bicycle sprocket assembly according to the first aspect is configured so that the first intervening member has an annular shape and is disposed to be coaxial with respect to the rotational center axis of the bicycle sprocket assembly.

In accordance with a twenty-eighth aspect of the present invention, the bicycle sprocket assembly according to the twenty-seventh aspect is configured so that the second intervening member has an annular shape and is disposed to be coaxial with respect to the rotational center axis of the bicycle sprocket assembly.

In accordance with a twenty-ninth aspect of the present invention, the bicycle sprocket assembly according to the first aspect is configured so that the first sprocket has a first opening and a first inner periphery. The first opening is provided on the first sprocket body. The first inner periphery defines the first opening. The second intervening member includes a first elongated portion at least partly extending along the first inner periphery.

In accordance with a thirtieth aspect of the present invention, the bicycle sprocket assembly according to the first aspect is configured so that the first sprocket has first openings and first inner peripheries. The first openings are provided on the first sprocket body. The first inner peripheries respectively define the first openings. The second intervening member includes first elongated portions and first additional elongated portions. The first elongated portions each at least partly extend along one of the first inner peripheries. The first additional elongated portions each at least partly extending along another of the first inner peripheries which is adjacent to the one of the first inner peripheries.

In accordance with a thirty-first aspect of the present invention, the bicycle sprocket assembly according to the twenty-ninth aspect further comprises a third sprocket, a third intervening member, and a fourth intervening member. The third sprocket includes a third sprocket body and a third chain-engagement structure configured to engage with the bicycle chain. The third sprocket body has a third hub engagement profile configured to engage with the bicycle hub assembly. The second sprocket is positioned between the first sprocket and the third sprocket in the axial direction. The third intervening member is positioned between the second sprocket and the third sprocket in the axial direction. The fourth intervening member is positioned between the second sprocket and the third sprocket in the axial direction. The fourth intervening member is provided radially outwardly from the third intervening member with respect to the rotational center axis. The fourth intervening member is attached to at least one of the second sprocket and the third sprocket. The second sprocket has a second opening and a second inner periphery. The second opening is provided on the second sprocket body. The second inner periphery defines the second opening. The first opening is aligned with the second opening in the axial direction. The fourth intervening member includes a second elongated portion at least partly extending the second inner periphery.

In accordance with a thirty-second aspect of the present invention, the bicycle sprocket assembly according to the thirtieth aspect further comprises a third sprocket, a third intervening member, and a fourth intervening member. The third sprocket includes a third sprocket body and a third chain-engagement structure configured to engage with the bicycle chain. The third sprocket body has a third hub engagement profile configured to engage with the bicycle hub assembly. The second sprocket is positioned between the first sprocket and the third sprocket in the axial direction. The third intervening member is positioned between the second sprocket and the third sprocket in the axial direction. The fourth intervening member is positioned between the second sprocket and the third sprocket in the axial direction. The fourth intervening member is provided radially outwardly from the third intervening member with respect to the rotational center axis. The fourth intervening member is attached to at least one of the second sprocket and the third sprocket. The second sprocket has second openings and second inner peripheries. The second openings are provided on the second sprocket body. The second inner peripheries respectively define the second opening. The fourth intervening member includes second elongated portions and second additional elongated portions. The second elongated portions each at least partly extend along one of the second inner peripheries. The second additional elongated portions each at least partly extend along another of the second inner peripheries which is adjacent to the one of the second inner peripheries.

In accordance with a thirty-third aspect of the present invention, a bicycle rear sprocket assembly has a rotational center axis. The bicycle rear sprocket assembly comprises a first sprocket and a second sprocket. The first sprocket includes a first sprocket body and a first chain-engagement structure. The first sprocket body is made of a non-metallic material. The first chain-engagement structure is made of a metallic material and is configured to engage with a bicycle chain. The second sprocket includes a second sprocket body and a second chain-engagement structure. The second sprocket body is made of a non-metallic material and attached to the first sprocket body. The second chain-engagement structure is made of a metallic material and is configured to engage with the bicycle chain.

In accordance with a thirty-fourth aspect of the present invention, the bicycle rear sprocket assembly according to the thirty-third aspect is configured so that the first sprocket body and the second sprocket body provide a base portion having a truncated conical shape In accordance with a thirty-fifth aspect of the present invention, the bicycle rear sprocket assembly according to the thirty-third aspect is configured so that the first chain-engagement structure of the first sprocket includes a first annular member and a plurality of first teeth circumferentially arranged on an outer periphery of the first annular member. The second chain-engagement structure of the second sprocket includes a second annular member and a plurality of second teeth circumferentially arranged on an outer periphery of the second annular member. The first annular member is at least partly embedded in the first sprocket body. The second annular member is at least partly embedded in the second sprocket body.

In accordance with a thirty-sixth aspect of the present invention, the bicycle rear sprocket assembly according to the thirty-fifth aspect is configured so that the first annular member is at least partly embedded in the first sprocket body by integral molding. The second annular member is at least partly embedded in the second sprocket body by integral molding.

In accordance with a thirty-seventh aspect of the present invention, the bicycle rear sprocket assembly according to the thirty-third aspect is configured so that the first sprocket body is attached to the second sprocket body by adhesive.

In accordance with a thirty-eighth aspect of the present invention, the bicycle rear sprocket assembly according to the thirty-third aspect is configured so that the first sprocket body is attached to the second sprocket body through a concavo-convex structure.

In accordance with a thirty-ninth aspect of the present invention, the bicycle rear sprocket assembly according to the thirty-third aspect further comprises a tubular member positioned coaxially with the rotational center axis. The tubular member has a hub engagement profile configured to engage with a bicycle hub assembly.

In accordance with a fortieth aspect of the present invention, the bicycle rear sprocket assembly according to the thirty-ninth aspect further comprises an internal space provided between the base portion and the tubular member in a radial direction with respect to the rotational center axis.

In accordance with a forty-first aspect of the present invention, the bicycle rear sprocket assembly according to the thirty-third aspect is configured so that the first sprocket body and the second sprocket body are integral with each other as a single unitary member.

In accordance with a forty-second aspect of the present invention, the bicycle rear sprocket assembly according to the thirty-third aspect is configured so that the second sprocket body is directly attached to the first sprocket body.

In accordance with a forty-third aspect of the present invention, the bicycle rear sprocket assembly according to the thirty-third aspect is configured so that the second sprocket body is attached to the first sprocket body via an intervening member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
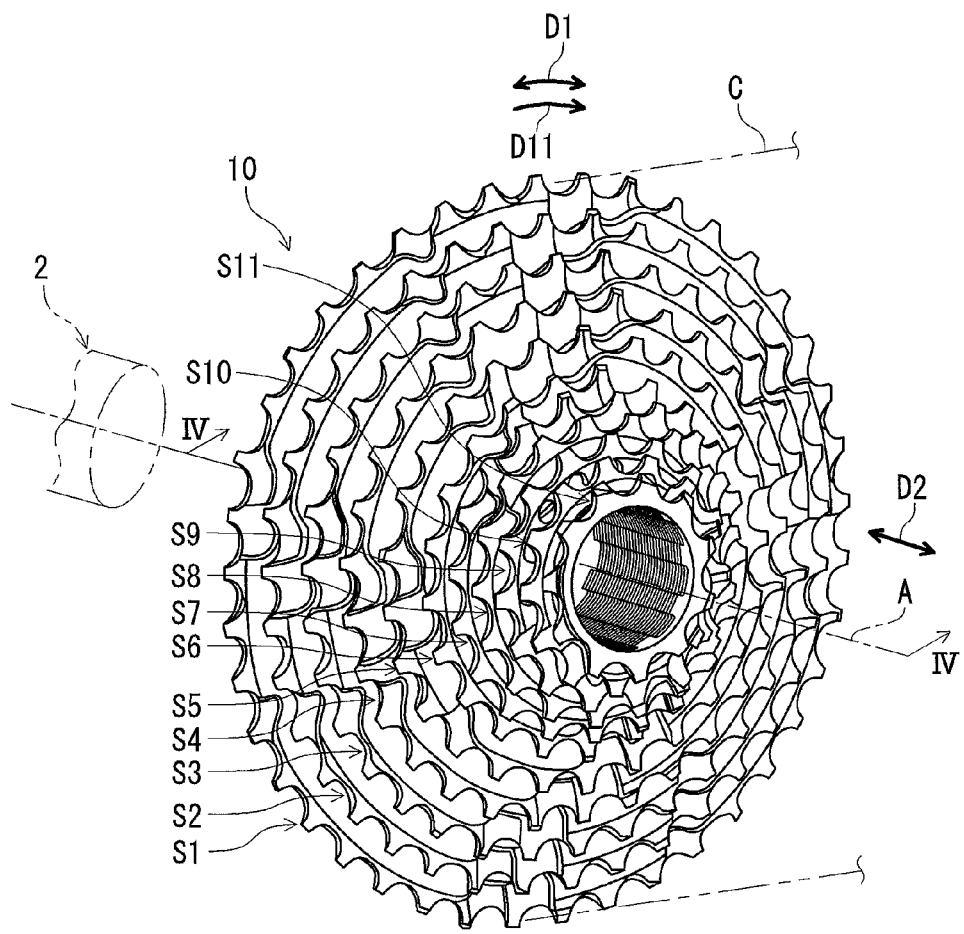
FIG. 1 is a perspective view of a bicycle sprocket assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle sprocket assembly 10 in accordance with a first embodiment comprises a plurality of bicycle sprockets. The bicycle sprocket assembly 10 is configured to engage with a bicycle chain C. In the illustrated embodiment, the bicycle sprocket assembly 10 comprises eleven bicycle sprockets S1 to S11. The bicycle sprocket assembly 10 has a rotational center axis A. The bicycle sprocket assembly 10 is configured to be rotated about the rotational center axis A in a rotational driving direction D11 during pedaling. The rotational driving direction D11 is defined along a circumferential direction D1 of the bicycle sprocket assembly 10. The bicycle sprockets S1 to S11 are arranged in an axial direction D2 parallel to the rotational center axis A.

While the bicycle sprocket assembly 10 is a bicycle rear sprocket assembly in the illustrated embodiment, constructions of the bicycle sprocket assembly 10 can be applied to a bicycle front sprocket assembly if needed and/or desired. In the illustrated embodiment, the bicycle sprocket assembly 10 is configured to be mounted on a bicycle hub assembly 2.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 10, should be interpreted relative to the bicycle equipped with the bicycle sprocket assembly 10 as used in an upright riding position on a horizontal surface.

As seen in FIG. 1, the bicycle sprocket assembly 10 comprises a first sprocket and a second sprocket. In the illustrated embodiment, the bicycle sprocket S2 is also referred to as the first sprocket S2, and the bicycle sprocket S3 is also referred to as the second sprocket S3. The bicycle sprocket assembly 10 further comprises a third sprocket. In the illustrated embodiment, the bicycle sprockets S4 is also referred to as the third sprocket S4. However, other sprockets of the bicycle sprocket assembly 10 can be referred to as the first sprocket, the second sprocket, and the third sprocket if needed and/or desired.

Figure 2:
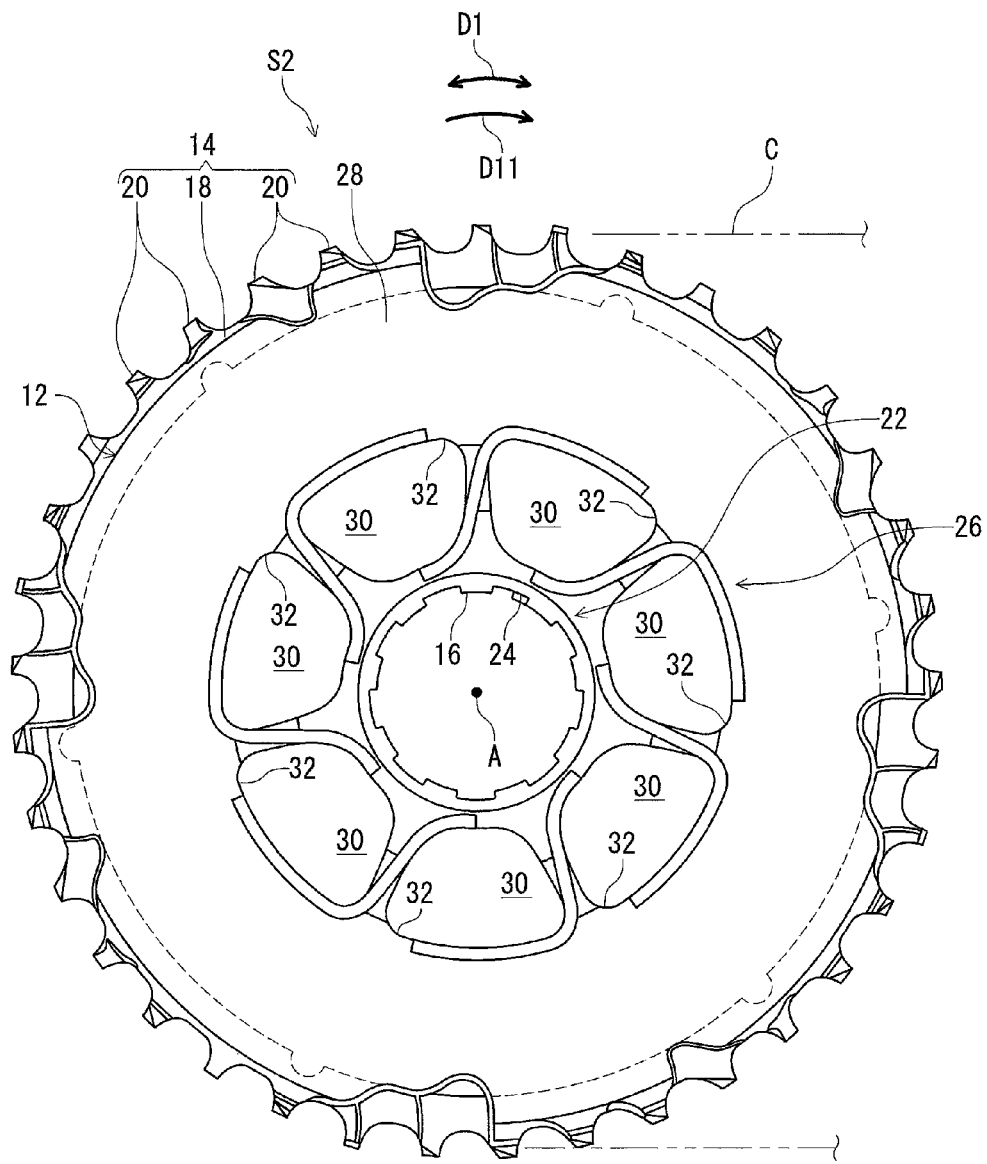
FIG. 2 is an elevational view of a first sprocket, a first intervening member and a second intervening member of the bicycle sprocket assembly illustrated in FIG. 1.
Figure 3:
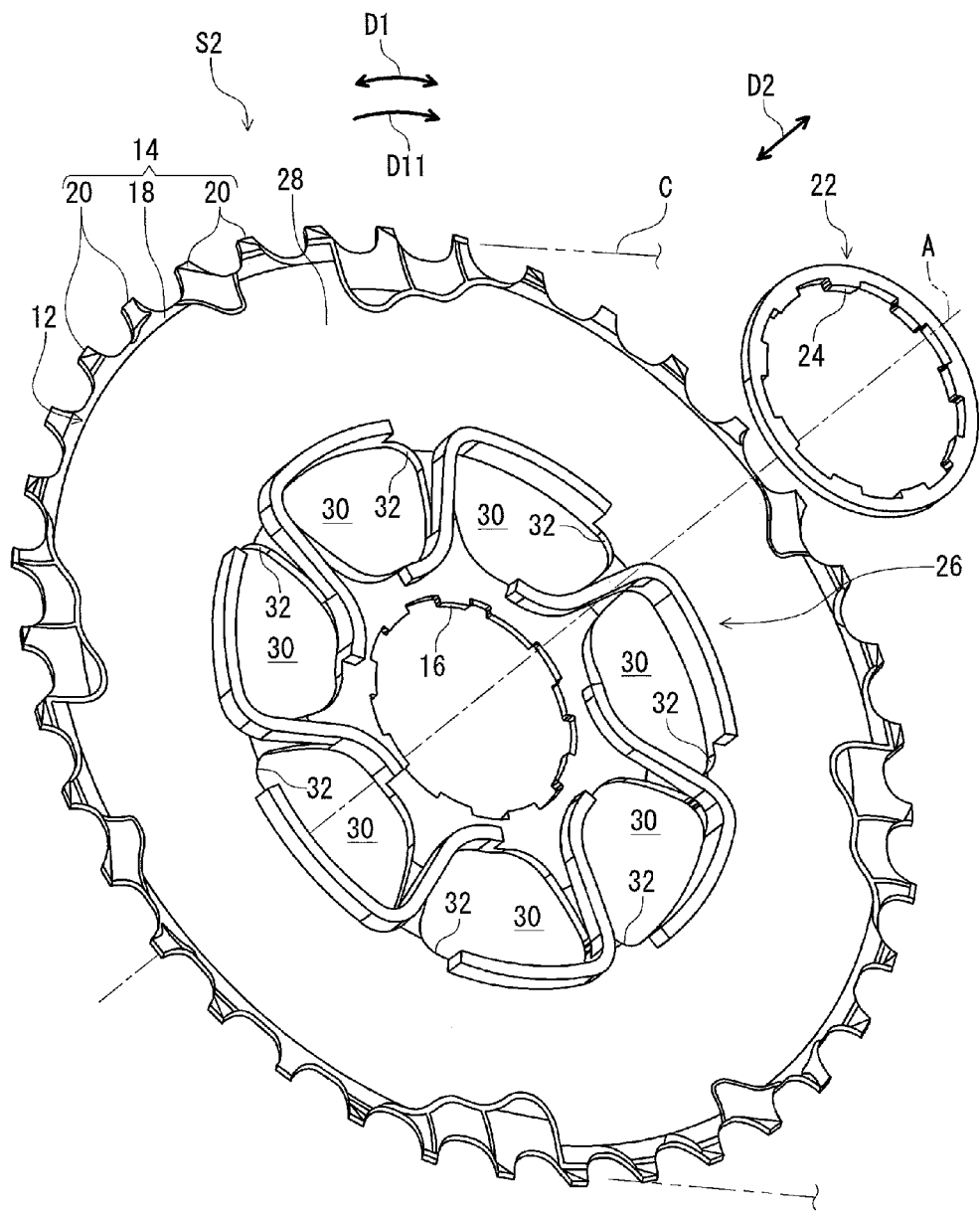
FIG. 3 is an exploded perspective view of the first sprocket, the first intervening member and the second intervening member of the bicycle sprocket assembly illustrated in FIG. 1.

As seen in FIGS. 2 and 3, the first sprocket S2 includes a first sprocket body 12 and a first chain-engagement structure 14. The first sprocket body 12 has a first hub engagement profile 16 configured to engage with the bicycle hub assembly 2 (FIG. 1). The first chain-engagement structure 14 is configured to engage with the bicycle chain C. The first chain-engagement structure 14 includes a first annular member 18 and a plurality of first teeth 20. The plurality of first teeth 20 circumferentially are arranged on an outer periphery of the first annular member 18.

In the illustrated embodiment, for example, the first annular member 18 and the plurality of first teeth 20 are made of a metallic material. While the first teeth 20 is integral with the first annular member 18 in the illustrated embodiment, at least one of the first teeth 20 can be a separate member from the first annular member 18 if needed and/or desired.

The first sprocket body 12 is made of a non-metallic material. The first sprocket body 12 is made of a resin material. The first annular member 18 is attached to the first sprocket body 12 by integral molding. In the illustrated embodiment, the first annular member 18 is attached to the first sprocket body 12 by integral molding such as insert molding. However, the first annular member 18 can be attached to the first sprocket body 12 by adhesive if needed and/or desired.

The first sprocket body 12 can be made of non-metallic materials other than the resin material if needed and/or desired. Furthermore, the first sprocket body 12 can be made of a metallic material same as or different from the material of the first teeth 20 and the first annular member 18 if needed and/or desired. For example, the first sprocket body 12 can be made of a light weight metallic material such as aluminum whereas the first teeth 20 and the first annular member 18 can be made of a rigid metallic material such as iron or titanium.

As seen in FIGS. 2 and 3, the bicycle sprocket assembly 10 comprises a first intervening member 22. While the first intervening member 22 has an annular shape in the illustrated embodiment, the first intervening member 22 can have other shapes if needed and/or desired. The first intervening member 22 preferably has a hub engagement profile 24 configured to engage with the bicycle hub assembly 2 (FIG. 1). The hub engagement profile 24 of the first intervening member 22 has substantially the same as the first hub engagement profile 16 of the first sprocket body 12 when viewed from the axial direction D2. The first intervening member 22 is disposed to be coaxial with respect to the rotational center axis A of the bicycle sprocket assembly 10.

The bicycle sprocket assembly 10 comprises a second intervening member 26. The second intervening member 26 is provided radially outwardly from the first intervening member 22 with respect to the rotational center axis A. The first intervening member 22 and the second intervening member 26 are spaced apart from each other in a radial direction with respect to the rotational center axis A. While the second intervening member 26 includes a plurality of separate parts in the illustrated embodiment, the second intervening member 26 can be integrally provided as a single unitary member if needed and/or desired. Furthermore, while the first intervening member 22 is a separate member from the second intervening member 26 in the illustrated embodiment, the first intervening member 22 can be integrally provided with the second intervening member 26 as a single unitary member if needed and/or desired.

Figure 4:
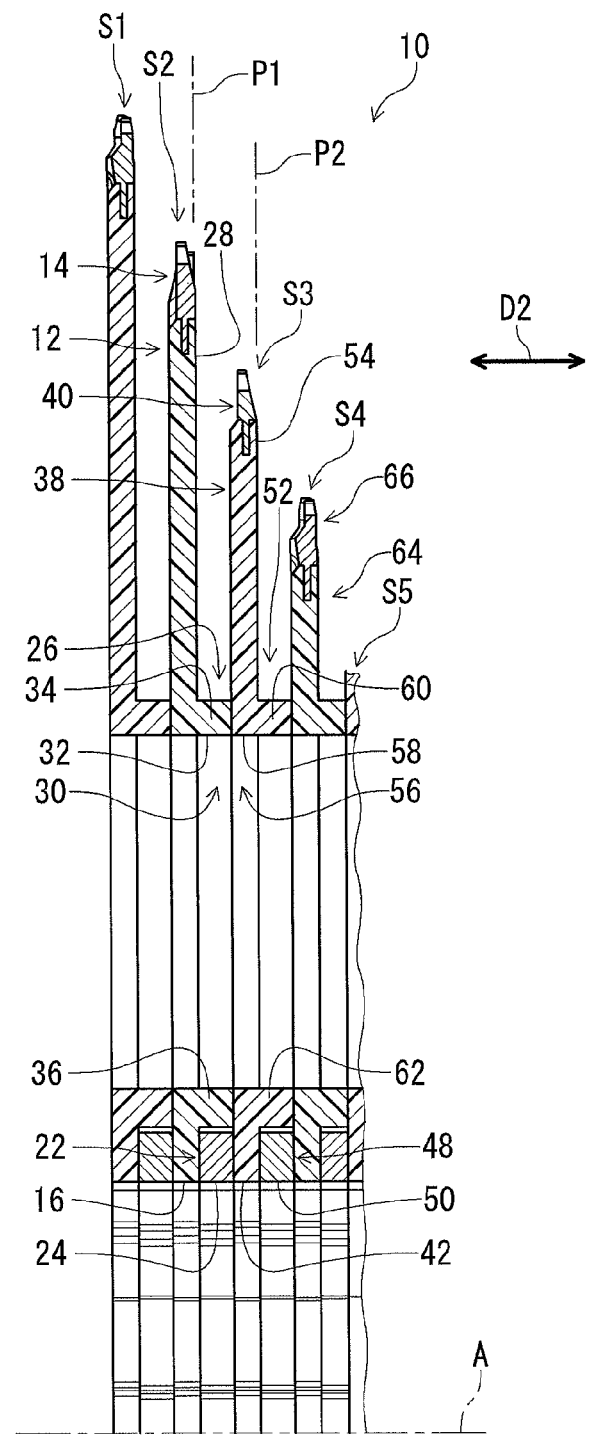
FIG. 4 is a partial cross-sectional view of the bicycle sprocket assembly taken along line IV-IV of FIG. 1.

As seen in FIGS. 3 and 4, the second intervening member 26 has an elongated shape extending along a first reference plane P1 (FIG. 4) perpendicular to the rotational center axis A. In the illustrated embodiment, the first sprocket S2 includes a side surface 28 provided on the first sprocket body 12 to face the second sprocket S3 in the axial direction D2 (FIG. 3). The first reference plane P1 is defined on the side surface 28 of the first sprocket S2. Namely, the second intervening member 26 has an elongated shape extending along the side surface 28 perpendicular to the rotational center axis A. The second intervening member 26 extends from the first sprocket body 12 in the axial direction D2.

As seen in FIG. 4, the first intervening member 22 is positioned between the first sprocket S2 and the second sprocket S3 in the axial direction D2 parallel to the rotational center axis A. The second intervening member 26 is positioned between the first sprocket S2 and the second sprocket S3 in the axial direction D2. The first sprocket S2 is adjacent to the second sprocket S3 without another sprocket intervening between the first sprocket S2 and the second sprocket S3 in the axial direction D2. The second sprocket S3 is adjacent to the third sprocket S4 without another sprocket intervening between the second sprocket S3 and the third sprocket S4 in the axial direction D2. The second sprocket S3 is positioned between the first sprocket S2 and the third sprocket S4 in the axial direction D2.

The first intervening member 22 is a separate member from the first sprocket S2 and the second sprocket S3. However, the first intervening member 22 can be integrally provided with at least one of the first sprocket S2 and the second sprocket S3 if needed and/or desired.

As seen in FIG. 4, the first intervening member 22 is attached to at least one of the first sprocket S2 and the second sprocket S3 by adhesive. In the illustrated embodiment, the first intervening member 22 is attached to the first sprocket S2 and the second sprocket S3 by adhesive. However, the first intervening member 22 can be attached to at least one of the first sprocket S2 and the second sprocket S3 via other structures if needed and/or desired. Furthermore, the first intervening member 22 can be attached to at least one of the first sprocket S2 and the second sprocket S3 by diffusion bonding if needed and/or desired. In such an embodiment, the first intervening member 22 and the at least one of the first sprocket S2 and the second sprocket S3 are at least partly made of a metallic material.

The second intervening member 26 is attached to at least one of the first sprocket S2 and the second sprocket S3. The second intervening member 26 is attached to at least one of the first sprocket S2 and the second sprocket S3 by adhesive. The second intervening member 26 is integral with one of the first sprocket S2 and the second sprocket S3 as a single unitary member. In the illustrated embodiment, the second intervening member 26 is integral with the first sprocket S2 as a single unitary member and is a separate member from the second sprocket S3. The second intervening member 26 is attached to the second sprocket S3 by adhesive. However, the second intervening member 26 can be a separate member from the first sprocket S2 if needed and/or desired. In such an embodiment, the second intervening member 26 is attached to the first sprocket S2 and the second sprocket S3. Furthermore, the second intervening member 26 can be attached to at least one of the first sprocket S2 and the second sprocket S3 by diffusion bonding if needed and/or desired. In such an embodiment, the second intervening member 26 and the at least one of the first sprocket S2 and the second sprocket S3 are at least partly made of a metallic material.

As seen in FIGS. 2 and 3, the first sprocket S2 has a first opening 30 and a first inner periphery 32. The first opening 30 is provided on the first sprocket body 12. The first inner periphery 32 defines the first opening 30. In the illustrated embodiment, the first sprocket S2 has first openings 30 and first inner peripheries 32. The first openings 30 are provided on the first sprocket body 12. The first inner peripheries 32 respectively define the first openings 30. A total number of the first openings 30 is not limited to the illustrated embodiment. While the first openings 30 has the same shape in the illustrated embodiment, at least one of the first openings 30 can have other shapes different from each other if needed and/or desired.

Figure 5:
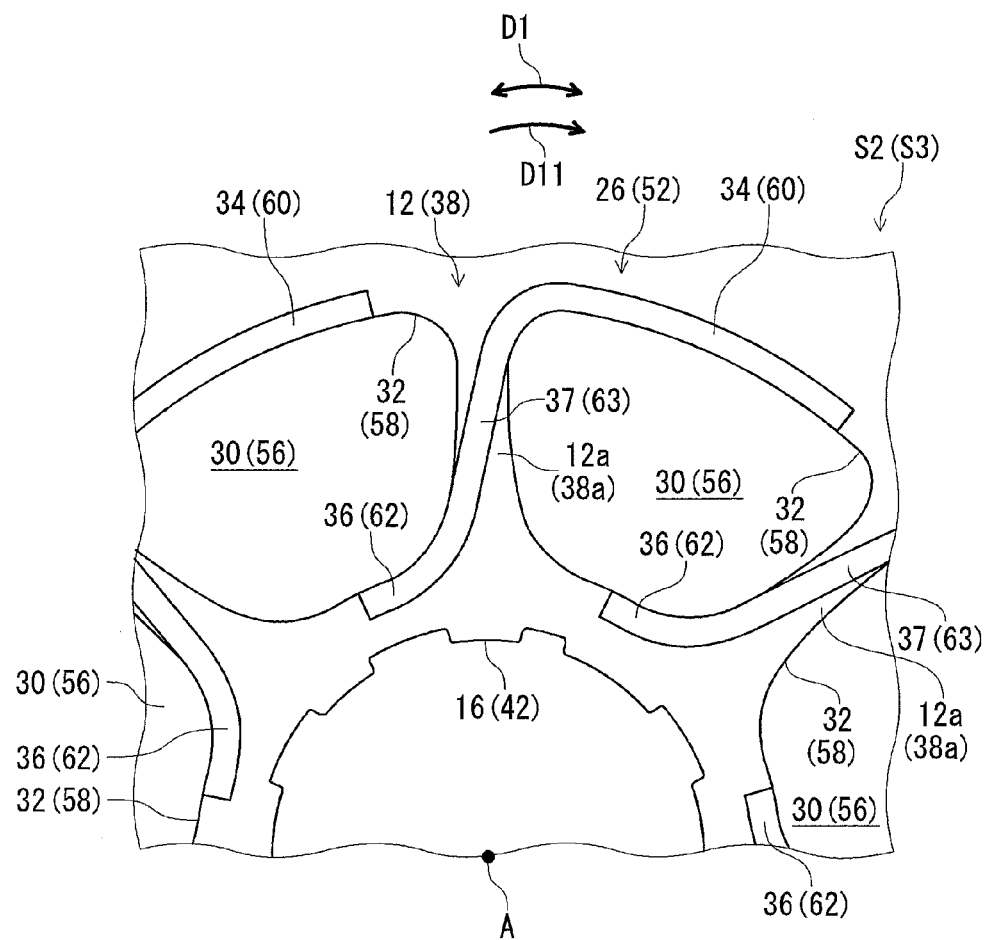
FIG. 5 is an enlarged side elevational view of the first sprocket and the first intervening member of the bicycle sprocket assembly illustrated in FIG. 1.

As seen in FIG. 5, the second intervening member 26 includes a first elongated portion 34 at least partly extending along the first inner periphery 32. In the illustrated embodiment, the second intervening member 26 includes first elongated portions 34 and first additional elongated portions 36. The first elongated portions 34 each at least partly extend along one of the first inner peripheries 32. The first additional elongated portions 36 each at least partly extend along another of the first inner peripheries 32 which is adjacent to the one of the first inner peripheries 32. While the first elongated portions 34 are provided radially outward of the first additional elongated portions 36 in the illustrated embodiment, the first elongated portions 34 can be provided radially inward of the first additional elongated portions 36 or provided at radial positions equal to radial positions of the first additional elongated portions 36 if needed and/or desired. A total number of each of the first elongated portions 34 and the first additional elongated portions 36 is not limited to the illustrated embodiment.

The second intervening member 26 includes a first intermediate portion 37 coupling the first elongated portion 34 to the first additional elongated portion 36. In the illustrated embodiment, the second intervening member 26 includes first intermediate portions 37 respectively coupling the first elongated portions 34 to the first additional elongated portions 36. The first sprocket body 12 includes first arm portions 12a radially extending relative to the rotational center axis A. Each of the first arm portions 12a is provided between adjacent two of the first openings 30. The first intermediate portions 37 are respectively provided on the first arm portions 12a.

In the illustrated embodiment, the first elongated portion 34 extends in the circumferential direction D1. The first additional elongated portion 36 extends in the circumferential direction D1. The first intermediate portion 37 substantially radially extends relative to the rotational center axis A.

Figure 6:
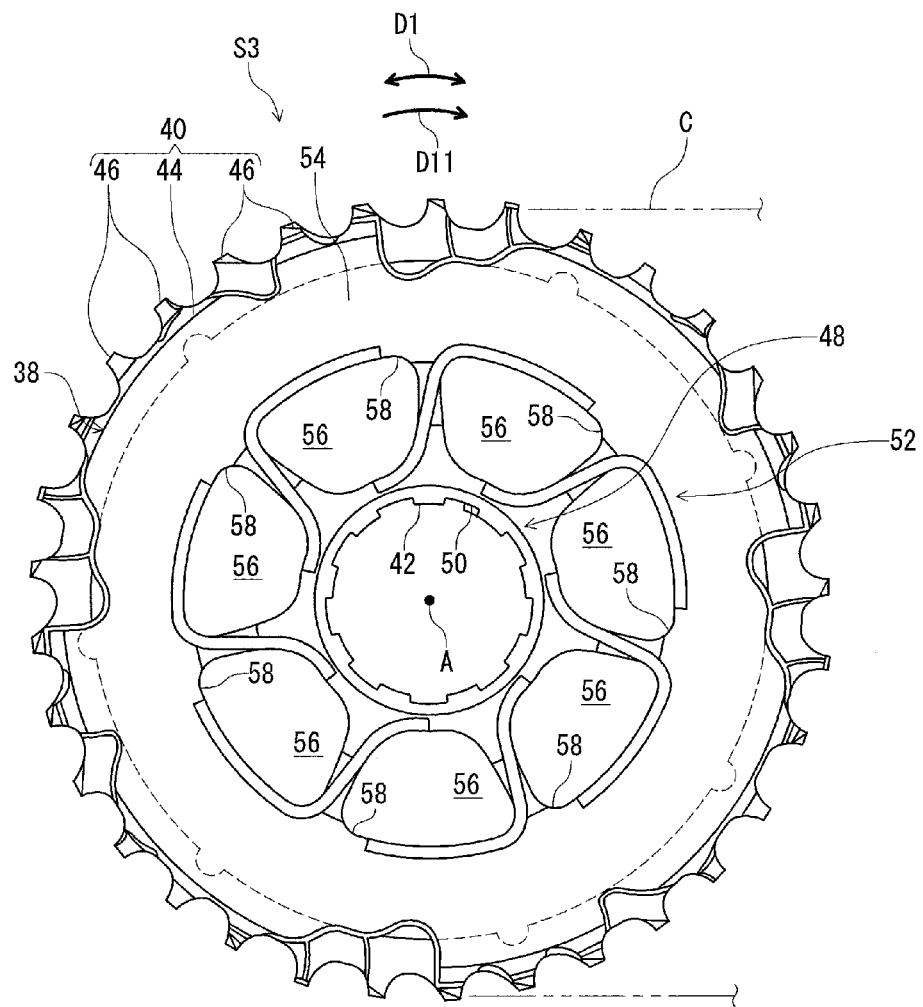
FIG. 6 is an elevational view of a second sprocket, a third intervening member and a fourth intervening member of the bicycle sprocket assembly illustrated in FIG. 1.
Figure 7:
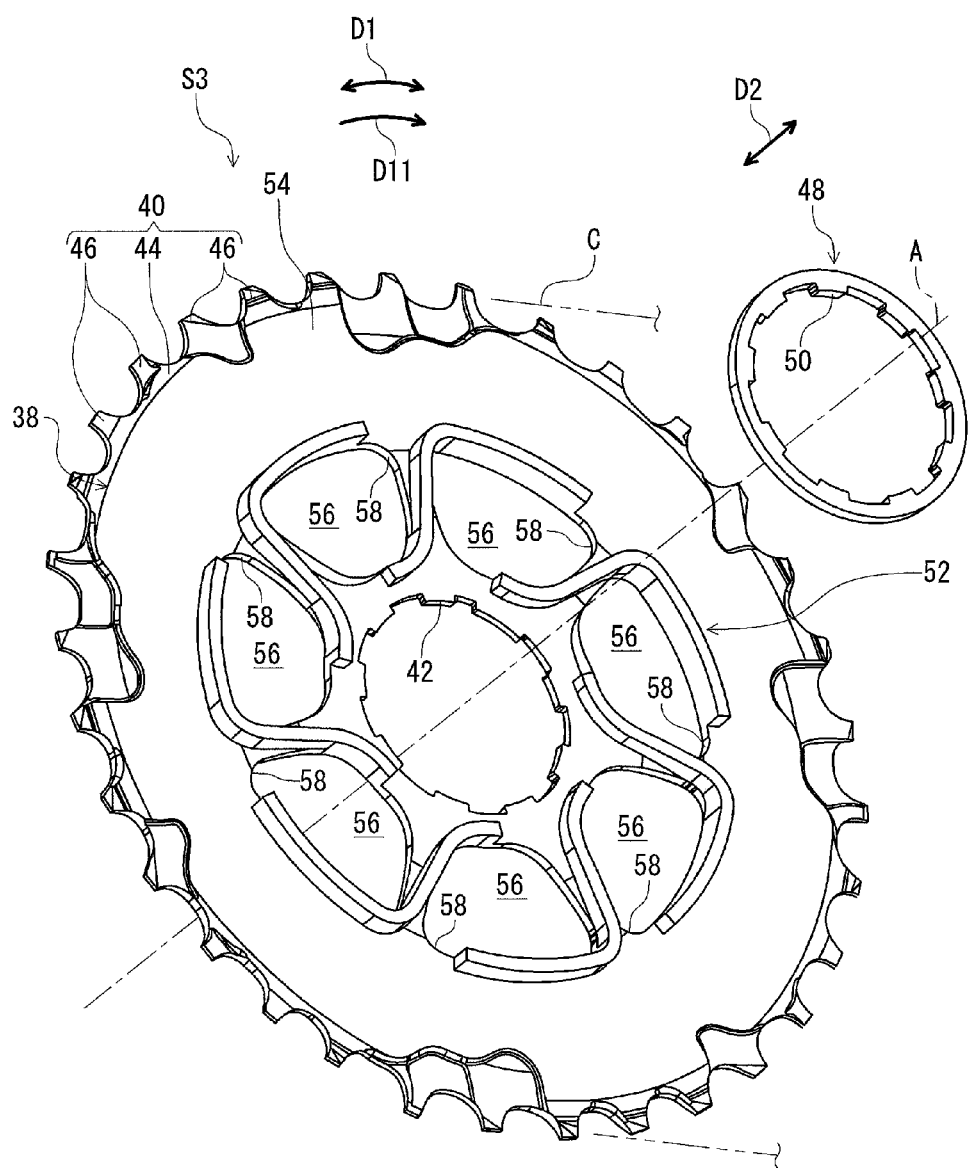
FIG. 7 is an exploded perspective view of the second sprocket, the third intervening member and the fourth intervening member of the bicycle sprocket assembly illustrated in FIG. 1.

As seen in FIGS. 6 and 7, the second sprocket S3 includes a second sprocket body 38 and a second chain-engagement structure 40. The second chain-engagement structure 40 is configured to engage with the bicycle chain C. The second sprocket body 38 has a second hub engagement profile 42 configured to engage with the bicycle hub assembly 2 (FIG. 1). The second chain-engagement structure 40 includes a second annular member 44 and a plurality of second teeth 46.

The plurality of second teeth 46 circumferentially are arranged on an outer periphery of the second annular member 44.

In the illustrated embodiment, for example, the second annular member 44 and the plurality of second teeth 46 are made of a metallic material. While the second teeth 46 is integral with the second annular member 44 in the illustrated embodiment, at least one of the second teeth 46 can be a separate member from the second annular member 44 if needed and/or desired. The second sprocket body 38 is made of a non-metallic material. For example, the second sprocket body 38 is made of a resin material. The second annular member 44 is attached to the second sprocket body 38 by integral molding. However, the second annular member 44 can be attached to the second sprocket body 38 by adhesive if needed and/or desired.

The second sprocket body 38 can be made of non-metallic materials other than the resin material if needed and/or desired. Furthermore, the second sprocket body 38 can be made of a metallic material same as or different from the material of the second teeth 46 the second annular member 44 if needed and/or desired. For example, the second sprocket body 38 can be made of a light weight metallic material such as aluminum whereas the second teeth 46 and the second annular member 44 can be made of a rigid metallic material such as iron or titanium.

As seen in FIG. 4, the second sprocket body 38 is attached to the first sprocket body 12. In the illustrated embodiment, the second sprocket body 38 is attached to the first sprocket body 12 via an intervening member. The second sprocket body 38 is attached to the first sprocket body 12 via the first intervening member 22 and the second intervening member 26. However, the second sprocket body 38 can be directly attached to the first sprocket body 12 if needed and/or desired.

As seen in FIGS. 2 and 6, the plurality of first teeth 20 have a first total number. The plurality of second teeth 46 have a second total number. The first total number is larger than the second total number. However, the first total number can be smaller than the second total number if needed and/or desired.

As seen in FIGS. 6 and 7, the bicycle sprocket assembly 10 further comprises a third intervening member 48. While the third intervening member 48 has an annular shape in the illustrated embodiment, the third intervening member 48 can have other shapes if needed and/or desired. The third intervening member 48 preferably has a hub engagement profile 50 configured to engage with the bicycle hub assembly (FIG. 1). The hub engagement profile 50 of the third intervening member 48 has substantially the same as the second hub engagement profile 42 of the second sprocket body 38 when viewed from the axial direction D2. The third intervening member 48 is disposed to be coaxial with respect to the rotational center axis A of the bicycle sprocket assembly 10.

As seen in FIGS. 6 and 7, the bicycle sprocket assembly 10 further comprises a fourth intervening member 52. The fourth intervening member 52 is provided radially outwardly from the third intervening member 48 with respect to the rotational center axis A. The third intervening member 48 and the fourth intervening member 52 are spaced apart from each other in a radial direction with respect to the rotational center axis A. While the fourth intervening member 52 includes a plurality of separate parts in the illustrated embodiment, the fourth intervening member 52 can be integrally provided as a single unitary member if needed and/or desired. Furthermore, while the third intervening member 48 is a separate member from the fourth intervening member 52 in the illustrated embodiment, the third intervening member 48 can be integrally provided with the fourth intervening member 52 if needed and/or desired.

As seen in FIGS. 4 and 7, the fourth intervening member 52 has an elongated shape extending along a second reference plane P2 (FIG. 4) perpendicular to the rotational center axis A. In the illustrated embodiment, the second sprocket S3 includes a side surface 54 provided on the second sprocket body 38 to face the third sprocket S4 in the axial direction D2 (FIG. 7). The second reference plane P2 is defined on the side surface 54 of the second sprocket S3. Namely, the fourth intervening member 52 has an elongated shape extending along the side surface 54 perpendicular to the rotational center axis A. The fourth intervening member 52 extends from the second sprocket body 38 in the axial direction D2.

As seen in FIG. 4, the third intervening member 48 is positioned between the second sprocket S3 and the third sprocket S4 in the axial direction D2. The fourth intervening member 52 is positioned between the second sprocket S3 and the third sprocket S4 in the axial direction D2.

The third intervening member 48 is a separate member from the second sprocket S3 and the third sprocket S4. However, the third intervening member 48 can be integrally provided with at least one of the second sprocket S3 and the third sprocket S4 if needed and/or desired.

As seen in FIG. 4, the third intervening member 48 is attached to at least one of the second sprocket S3 and the third sprocket S4 by adhesive. In the illustrated embodiment, the third intervening member 48 is attached to the second sprocket S3 and the third sprocket S4 by adhesive. However, the third intervening member 48 can be attached to at least one of the second sprocket S3 and the third sprocket S4 by other structures if needed and/or desired. Furthermore, the third intervening member 48 can be attached to at least one of the second sprocket S3 and the third sprocket S4 by diffusion bonding if needed and/or desired. In such an embodiment, the third intervening member 48 and the at least one of the second sprocket S3 and the third sprocket S4 are made of a metallic material.

The fourth intervening member 52 is attached to at least one of the second sprocket S3 and the third sprocket S4. The fourth intervening member 52 is attached to at least one of the second sprocket S3 and the third sprocket S4 by adhesive. The fourth intervening member 52 is integral with one of the second sprocket S3 and the third sprocket S4 as a single unitary member. In the illustrated embodiment, the fourth intervening member 52 is integral with the second sprocket S3 as a single unitary member and is a separate member from the third sprocket S4. However, the fourth intervening member 52 can be a separate member from the second sprocket S3 if needed and/or desired. In such an embodiment, the fourth intervening member 52 is attached to the second sprocket S3 and the third sprocket S4. Furthermore, the fourth intervening member 52 can be attached to the at least one of the second sprocket S3 and the third sprocket S4 by diffusion bonding if needed and/or desired. In such an embodiment, the fourth intervening member 52 and the at least one of the second sprocket S3 and the third sprocket S4 are at least partly made of a metallic material.

As seen in FIGS. 6 and 7, the second sprocket S3 has a second opening 56 and a second inner periphery 58. The second opening 56 is provided on the second sprocket body 38. The second inner periphery 58 defines the second opening 56. In the illustrated embodiment, the second sprocket S3 has second openings 56 and second inner peripheries 58. The second openings 56 are provided on the second sprocket body 38. The second inner peripheries 58 respectively define the second openings 56. A total number of the second openings 56 is not limited to the illustrated embodiment. While the second openings 56 has the same shape in the illustrated embodiment, at least one of the second openings 56 can have other shapes different from each other if needed and/or desired.

As seen in FIG. 5, the fourth intervening member 52 includes a second elongated portion 60 at least partly extending along the second inner periphery 58. In the illustrated embodiment, the fourth intervening member 52 includes second elongated portions 60 and second additional elongated portions 62. The second elongated portions 60 each at least partly extend along one of the second inner peripheries 58. The second additional elongated portions 62 each at least partly extend along another of the second inner peripheries 58 which is adjacent to the one of the second inner peripheries 58. While the second elongated portions 60 are provided radially outward of the second additional elongated portions 62 in the illustrated embodiment, the second elongated portions 60 can be provided radially inward of the second additional elongated portions 62 or provided at radial positions equal to radial positions of the second additional elongated portions 62 if needed and/or desired. A total number of each of the second elongated portions 60 and the second additional elongated portions 62 is not limited to the illustrated embodiment.

The fourth intervening member 52 includes a second intermediate portion 63 coupling the first elongated portion 60 to the first additional elongated portion 62. In the illustrated embodiment, the fourth intervening member 52 includes second intermediate portions 63 respectively coupling the second elongated portions 60 to the second additional elongated portions 62. The second sprocket body 38 includes second arm portions 38a radially extending relative to the rotational center axis A. Each of the second arm portions 38a is provided between adjacent two of the first openings 30. The second intermediate portions 63 are respectively provided on the second arm portions 38a.

In the illustrated embodiment, the second elongated portion 60 extends in the circumferential direction D1. The second additional elongated portion 62 extends in the circumferential direction D1. The second intermediate portion 63 substantially radially extends relative to the rotational center axis A.

Figure 8:
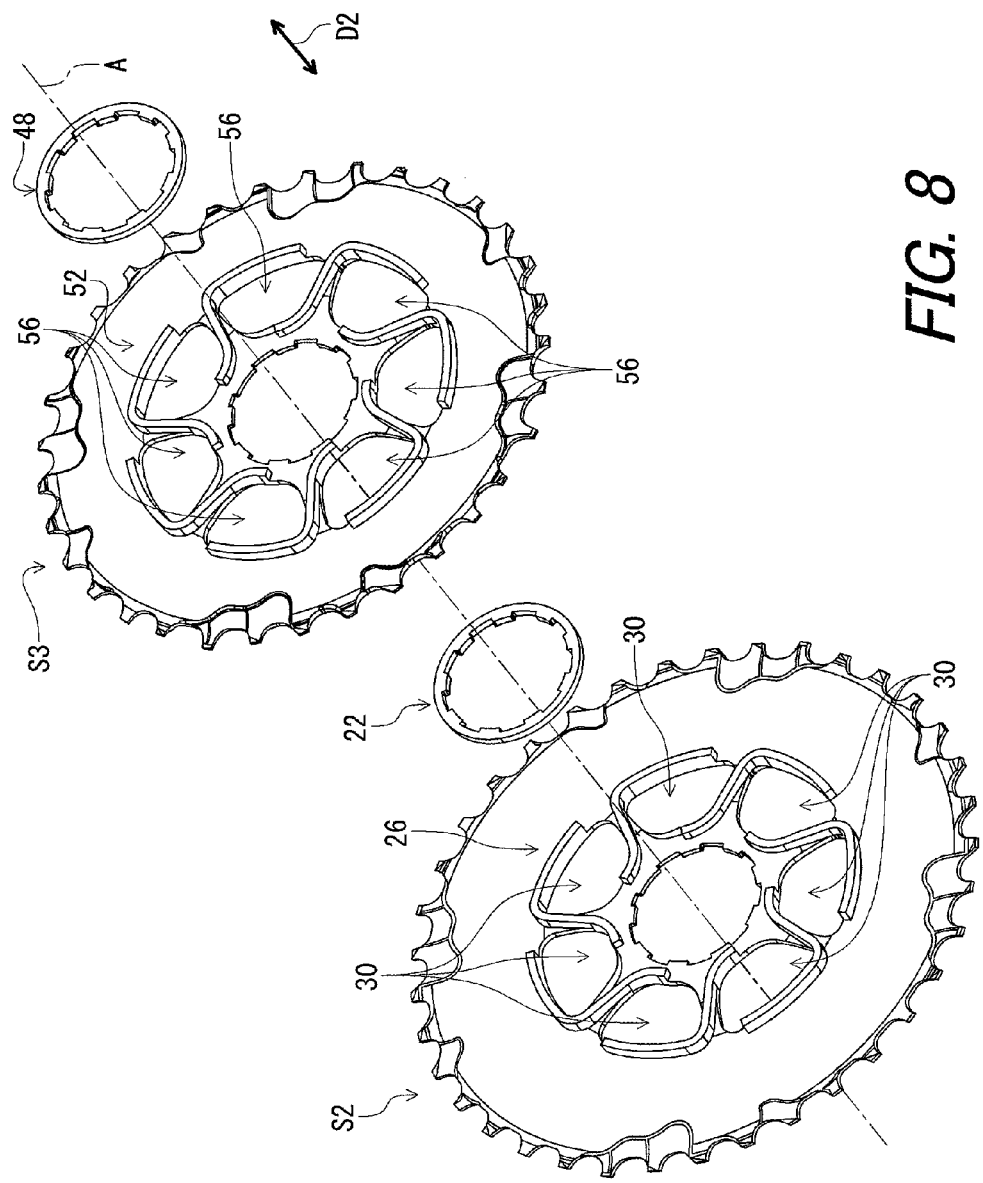
FIG. 8 is an exploded perspective view of the first sprocket, the first intervening member, the second intervening member, the second sprocket, the third intervening member and the fourth intervening member of the bicycle sprocket assembly illustrated in FIG. 1.

As seen in FIG. 8, the first opening 30 is aligned with the second opening 56 in the axial direction D2. While the first openings 30 has the same shape as the shape of the second openings 56 in the illustrated embodiment, the shapes of the first openings 30 and the second openings 56 can be different from each other if needed and/or desired. In the illustrated embodiment, the fourth intervening member 52 of the second sprocket S3 has the same shape as that of the second intervening member 26 of the first sprocket S2. However, the shape of the fourth intervening member 52 can be different from the shape of the second intervening member 26 if needed and/or desired.

Figure 9:
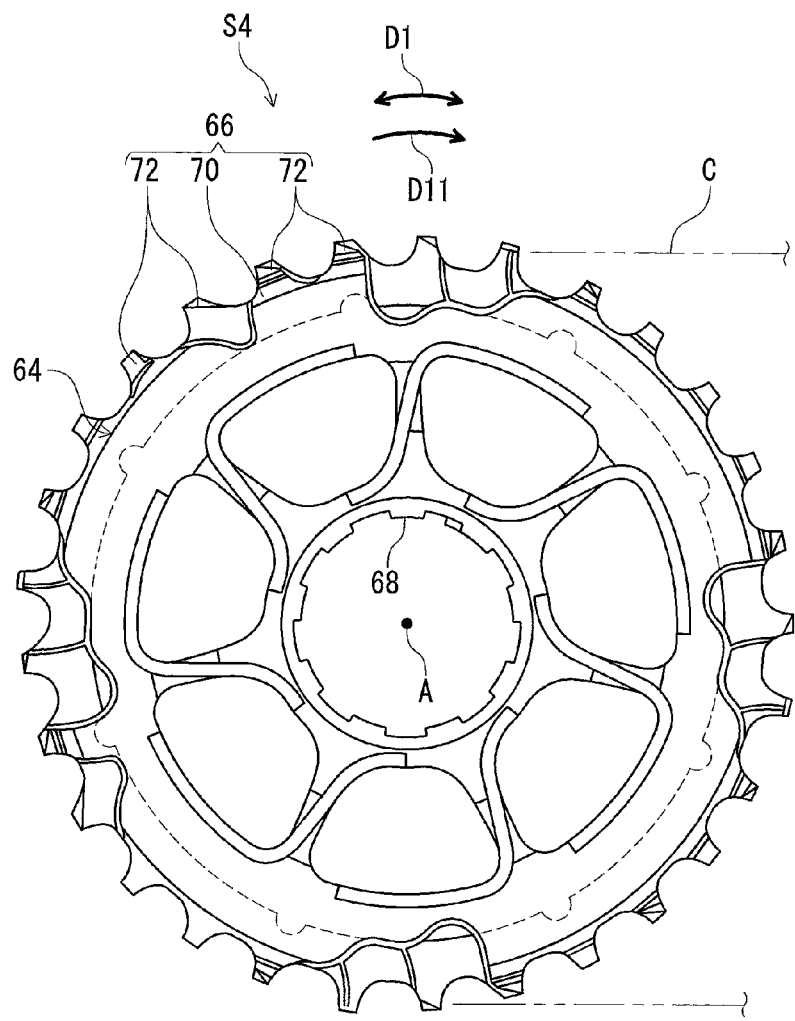
FIG. 9 is an elevational view of a third sprocket and other intervening members of the bicycle sprocket assembly illustrated in FIG. 1.
Figure 10:
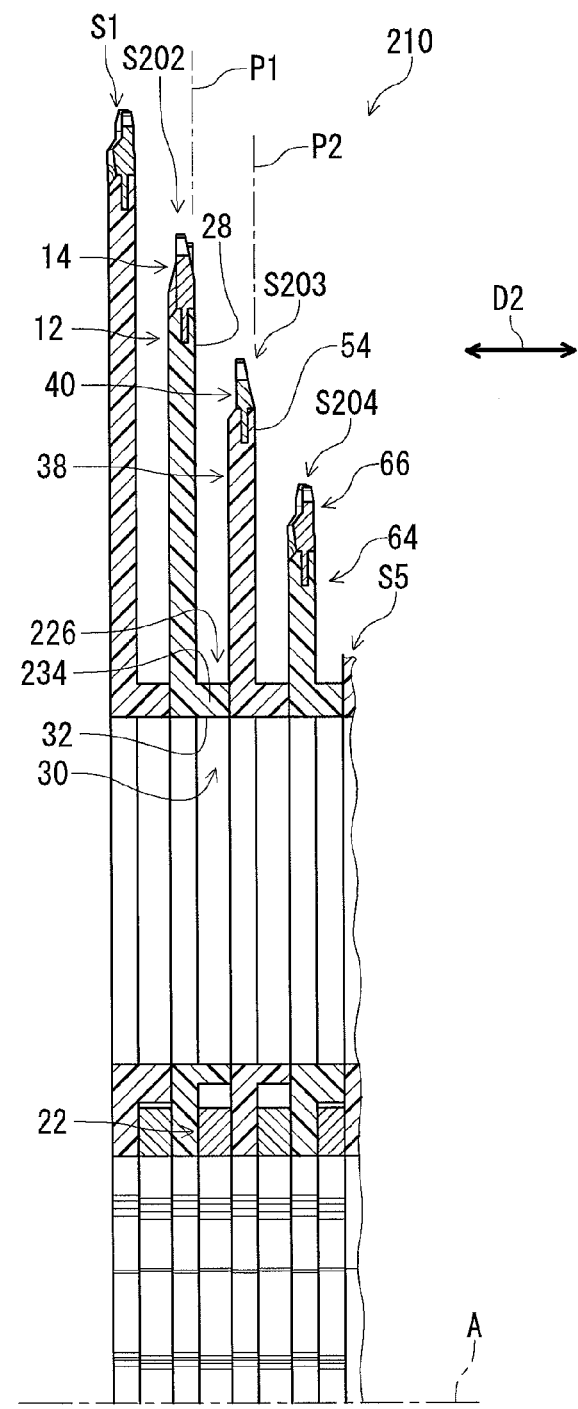
FIG. 10 is a partial cross-sectional view of a bicycle sprocket assembly in accordance with a second embodiment.

As seen in FIGS. 9 and 10, the third sprocket S4 includes a third sprocket body 64 and a third chain-engagement structure 66. The third chain-engagement structure 66 is configured to engage with the bicycle chain C. The third sprocket body 64 has a third hub engagement profile 68 configured to engage with the bicycle hub assembly 2 (FIG. 1). The third chain-engagement structure 66 includes a third annular member 70 and a plurality of third teeth 72. The plurality of third teeth 72 circumferentially are arranged on an outer periphery of the third annular member 70.

In the illustrated embodiment, for example, the third annular member 70 and the plurality of third teeth 72 are made of a metallic material. While the third teeth 72 is integral with the third annular member 70 in the illustrated embodiment, at least one of the third teeth 72 can be a separate member from the third annular member 70 if needed and/or desired. The third sprocket body 64 is made of a non-metallic material. For example, the third sprocket body 64 is made of a resin material. The third annular member 70 is attached to the third sprocket body 64 by integral molding. However, the third annular member 70 can be attached to the third sprocket body 64 by adhesive if needed and/or desired.

The third sprocket body 64 can be made of non-metallic materials other than the resin material if needed and/or desired. Furthermore, the third sprocket body 64 can be made of a metallic material same as or different from the material of the third teeth 72 and the third annular member 70 if needed and/or desired. For example, the third sprocket body 64 can be made of a light weight metallic material such as aluminum whereas the third teeth 72 and the third annular member 70 can be made of a rigid metallic material such as iron or titanium.

Since the third sprocket S4 and/or other sprockets has substantially the same structures as those of the first and second sprockets S2 and S3, they will not be described and/or illustrated in detail here for the sake of brevity.

With the bicycle sprocket assembly 10, the second intervening member 26 is attached to at least one of the first sprocket S2 and the second sprocket S3 and has an elongated shape extending along the first reference plane P1 perpendicular to the rotational center axis A. Accordingly, it is possible to obtain the desired strength of the bicycle sprocket assembly 10 while it is also possible to achieve desired weight saving of each sprocket.

Second Embodiment

A bicycle sprocket assembly 210 in accordance with a second embodiment will be described below referring to FIGS. 10 to 12. The bicycle sprocket assembly 210 has the same configuration as the bicycle sprocket assembly 10 except for the second intervening member. Thus, elements having substantially the same function as those in the first embodiment will be numbered the same here, and will not be described and/or illustrated again in detail here for the sake of brevity.

As seen in FIG. 10, the bicycle sprocket assembly 210 comprises a first sprocket S202 and a second sprocket S203 instead of the first sprocket S2 and the second sprocket S3. The bicycle sprocket assembly 210 further comprises a third sprocket S204 instead of the third sprocket S4. Other sprockets of the bicycle sprocket assembly 210 can be referred to as the first sprocket S202, the second sprocket S203, and the third sprocket S204 if needed and/or desired.

Figure 11:
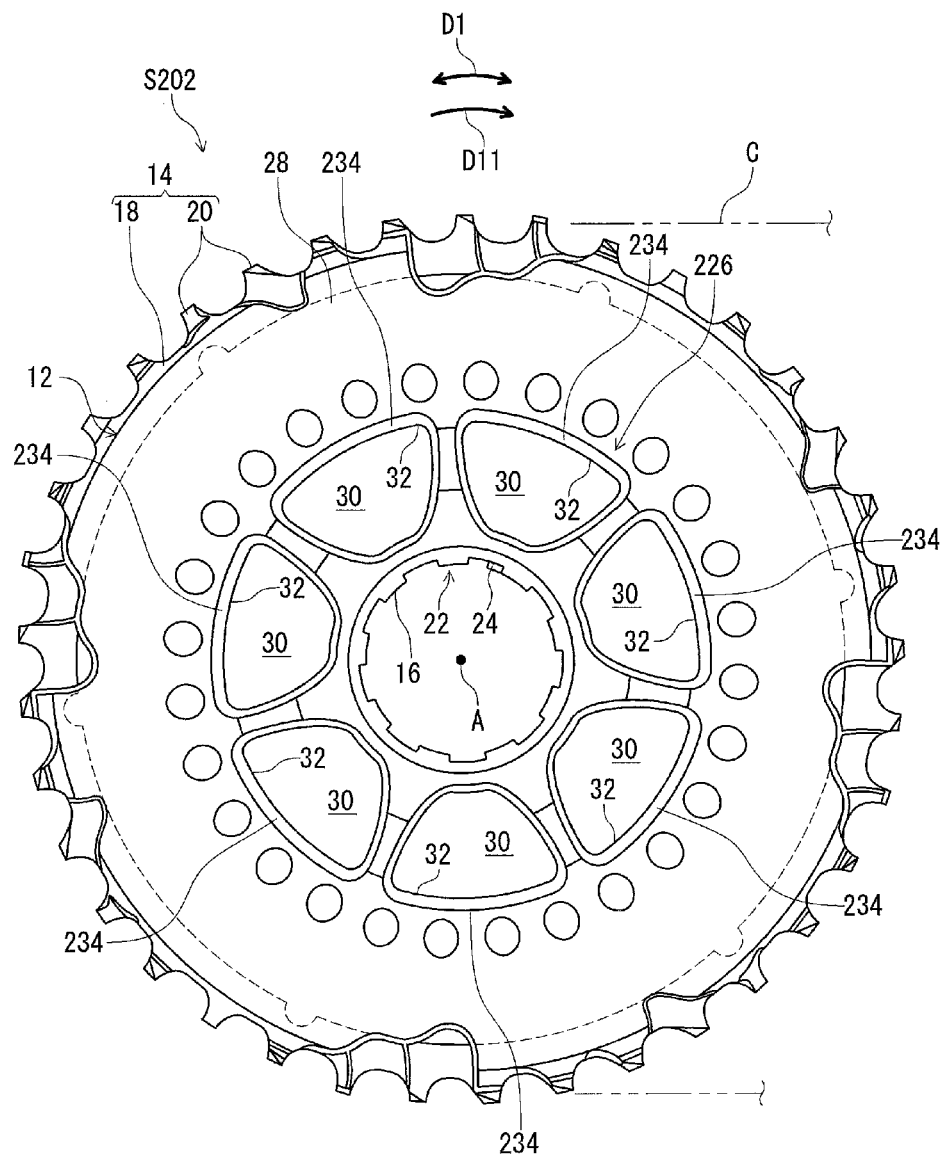
FIG. 11 is an elevational view of a first sprocket, a first intervening member and a second intervening member of the bicycle sprocket assembly illustrated in FIG. 10.
Figure 12:
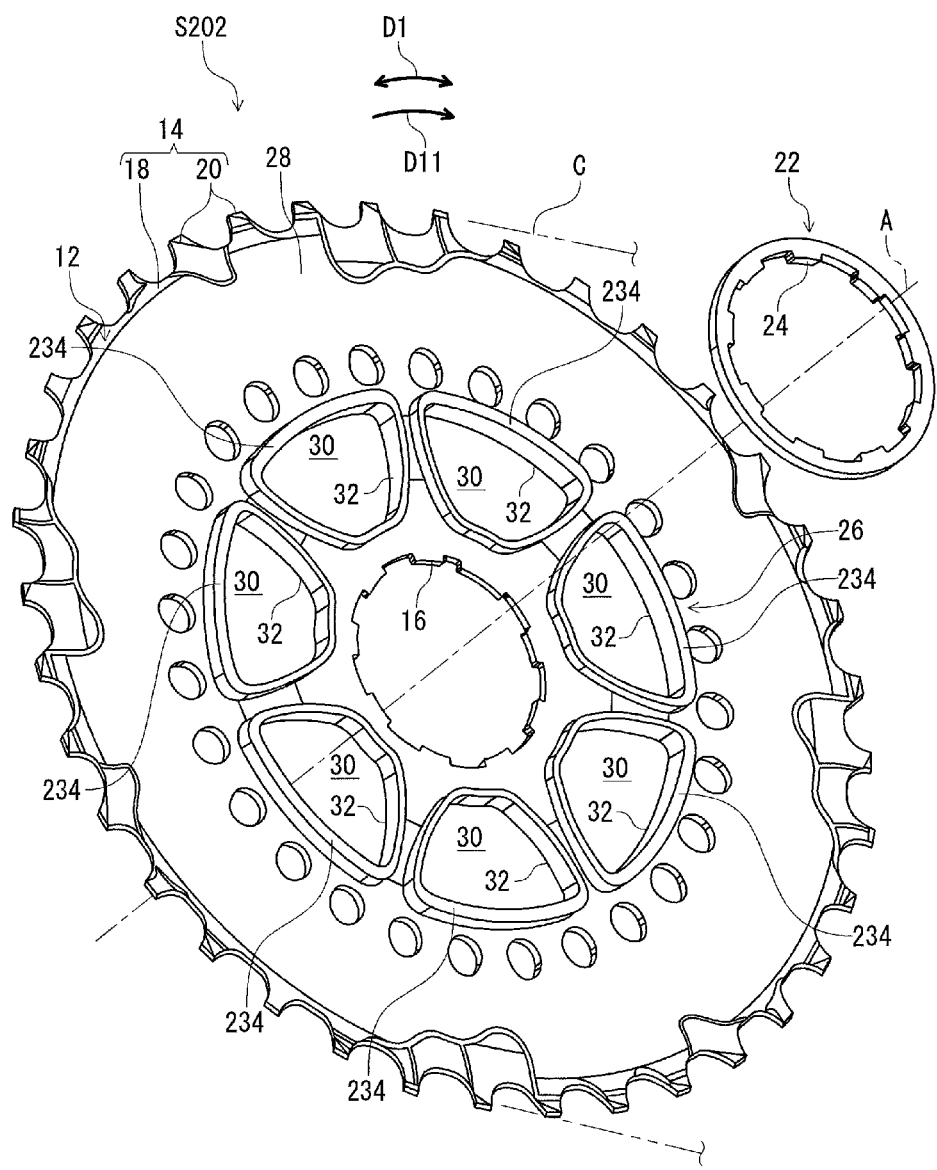
FIG. 12 is an exploded perspective view of the first sprocket, the first intervening member and the second intervening member of the bicycle sprocket assembly illustrated in FIG. 10.

As seen in FIGS. 11 and 12, the bicycle sprocket assembly 210 comprises the first intervening member 22 and a second intervening member 226. The second intervening member 226 is provided radially outwardly from the first intervening member 22 with respect to the rotational center axis A. The first intervening member 22 and the second intervening member 226 are spaced apart from each other in a radial direction with respect to the rotational center axis A. While the second intervening member 226 includes a plurality of separate parts in the illustrated embodiment, the second intervening member 226 can be integrally provided as a single unitary member if needed and/or desired. Furthermore, while the first intervening member 22 is a separate member from the second intervening member 226 in the illustrated embodiment, the first intervening member 22 can be integrally provided with the second intervening member 226 if needed and/or desired.

As seen in FIGS. 10 and 12, the second intervening member 226 has an elongated shape extending along the first reference plane P1 (FIG. 10) perpendicular to the rotational center axis A. The second intervening member 226 has an elongated shape extending along the side surface 28 perpendicular to the rotational center axis A.

As seen in FIGS. 11 and 12, the second intervening member 226 includes a first elongated portion 234 at least partly extending along the first inner periphery 32. In the illustrated embodiment, the first elongated portion 234 entirely extends along the first inner periphery 32 and surrounds the first opening 30. The second intervening member 226 includes first elongated portions 234. The first elongated portions 234 entirely extend along the first inner peripheries 32, respectively. A total number of each of the first elongated portions 234 is not limited to the illustrated embodiment. The second intervening member 226 extends from the second sprocket S202 in the axial direction D2.

As seen in FIG. 10, the second intervening member 226 is positioned between the first sprocket S202 and the second sprocket S203 in the axial direction D2. The second intervening member 226 is attached to at least one of the first sprocket S202 and the second sprocket S203. The second intervening member 226 is attached to at least one of the first sprocket S202 and the second sprocket S203 by adhesive. The second intervening member 226 is integral with one of the first sprocket S202 and the second sprocket S203 as a single unitary member.

In the illustrated embodiment, the second intervening member 226 is integral with the first sprocket S202 as a single unitary member and is a separate member from the second sprocket S203. The second intervening member 226 is attached to the second sprocket S203 by adhesive. However, the second intervening member 226 can be a separate member from the first sprocket S202 if needed and/or desired. In such an embodiment, the second intervening member 226 is attached to the first sprocket S202 and the second sprocket S203. Furthermore, the second intervening member 226 can be attached to at least one of the first sprocket S202 and the second sprocket S203 by diffusion bonding if needed and/or desired. In such an embodiment, the second intervening member 226 and the at least one of the first sprocket body 12 and the second sprocket body 38 are at least partly made of a metallic material.

Since the second sprocket S203 and the third sprocket S204 has substantially the same structures as those of the first sprocket S202, they will not be described and/or illustrated in detail here for the sake of brevity. Other sprockets can have substantially the same structures as those of the first sprocket S202 if needed and/or desired.

With the bicycle sprocket assembly 210, it is possible to obtain substantially the same advantageous effect as that of the bicycle sprocket assembly 10 in accordance with the first embodiment.

Third Embodiment

A bicycle sprocket assembly 310 in accordance with a third embodiment will be described below referring to FIGS. 13 to 19. The bicycle sprocket assembly 310 has the same configuration as the bicycle sprocket assembly 10 except for the second intervening member. Thus, elements having substantially the same function as those in the above embodiments will be numbered the same here, and will not be described and/or illustrated again in detail here for the sake of brevity.

Figure 13:
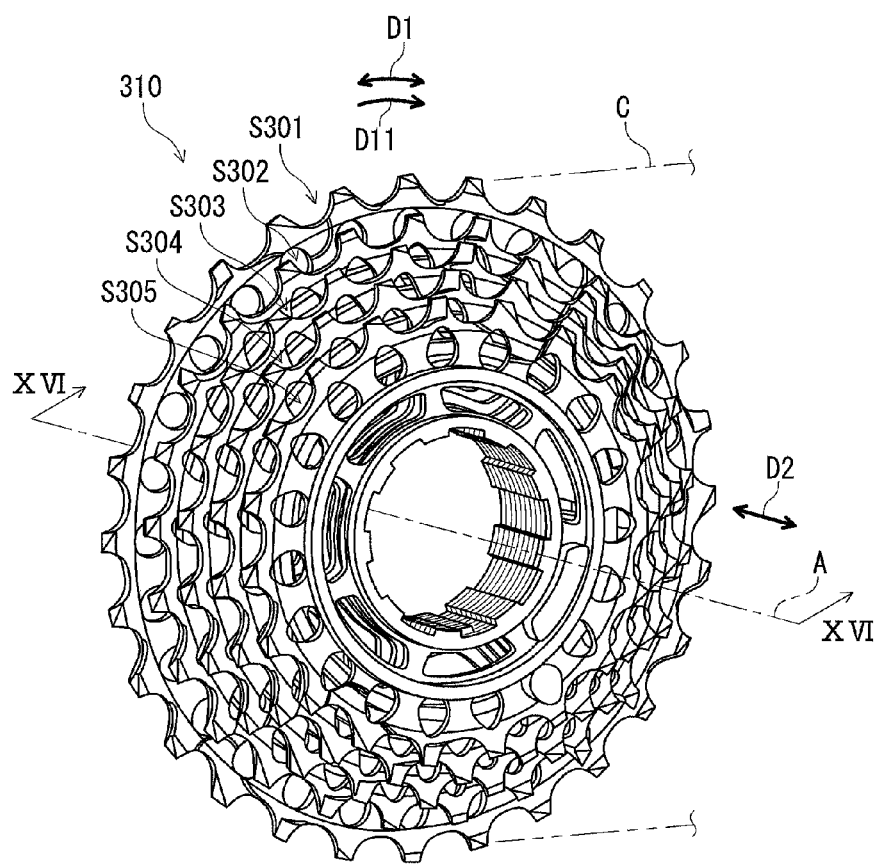
FIG. 13 is a perspective view of a bicycle sprocket assembly in accordance with a third embodiment.

As seen in FIG. 13, the bicycle sprocket assembly 310 is configured to engage with the bicycle chain C. In the illustrated embodiment, the bicycle sprocket assembly 310 comprises five bicycle sprockets S301 to S305 and other smaller sprockets. The other smaller sprockets are omitted from the bicycle sprocket assembly 310 as illustrated in FIG. 13. The bicycle sprocket assembly 310 has the rotational center axis A. The bicycle sprockets S301 to S305 are arranged in the axial direction D2 parallel to the rotational center axis A.

The bicycle sprocket assembly 310 comprises a first sprocket and a second sprocket. In the illustrated embodiment, the bicycle sprocket S301 is also referred to as the first sprocket S301, and the bicycle sprocket S302 is also referred to as the second sprocket S302. The bicycle sprocket assembly 310 further comprises a third sprocket. In the illustrated embodiment, the bicycle sprockets S303 is also referred to as the third sprocket S303. However, other sprockets of the bicycle sprocket assembly 310 can be referred to as the first sprocket, the second sprocket, and the third sprocket if needed and/or desired.

Figure 14:
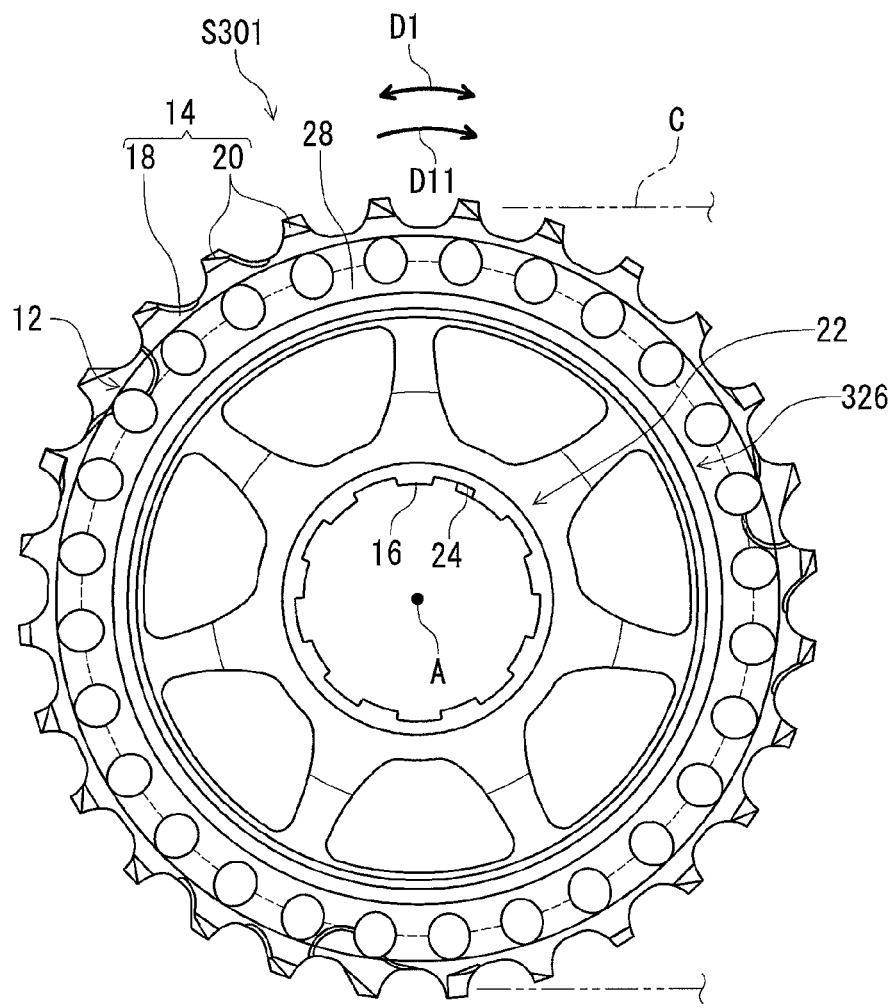
FIG. 14 is an elevational view of a first sprocket, a first intervening member and a second intervening member of the bicycle sprocket assembly illustrated in FIG. 13.
Figure 15:
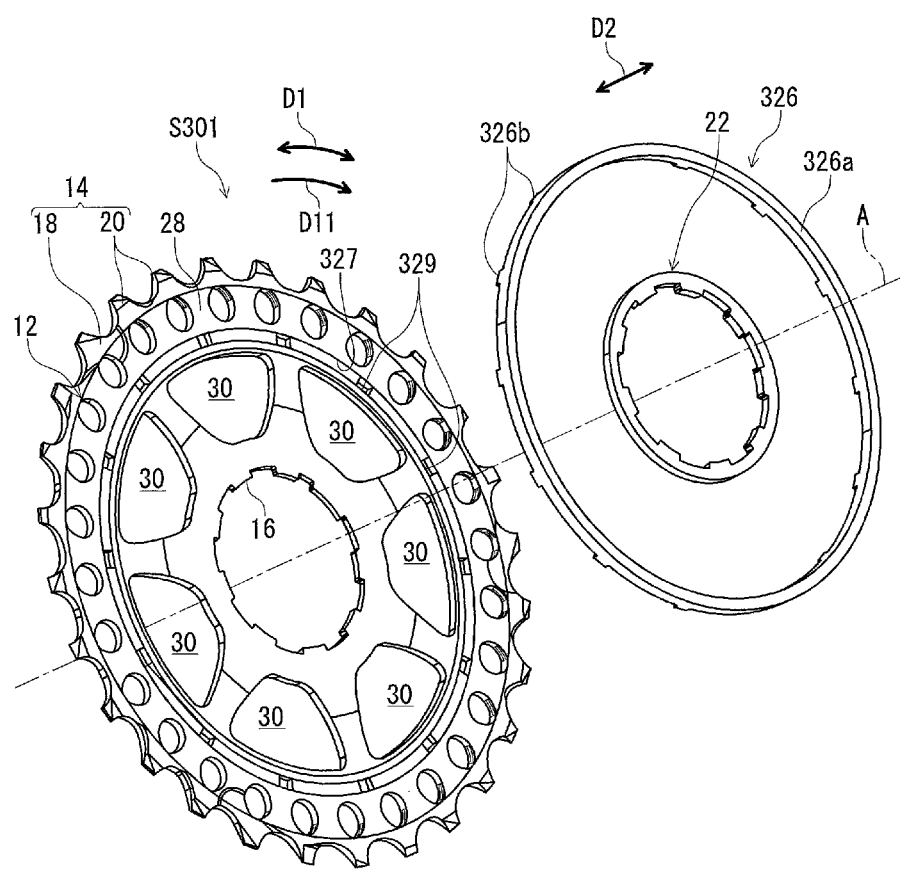
FIG. 15 is an exploded perspective view of the first sprocket, the first intervening member and the second intervening member of the bicycle sprocket assembly illustrated in FIG. 13.

As seen in FIGS. 14 and 15, the bicycle sprocket assembly 310 comprises the first intervening member 22 and a second intervening member 326. The second intervening member 326 is provided radially outwardly from the first intervening member 22 with respect to the rotational center axis A. The first intervening member 22 and the second intervening member 326 are spaced apart from each other in a radial direction with respect to the rotational center axis A.

Figure 16:
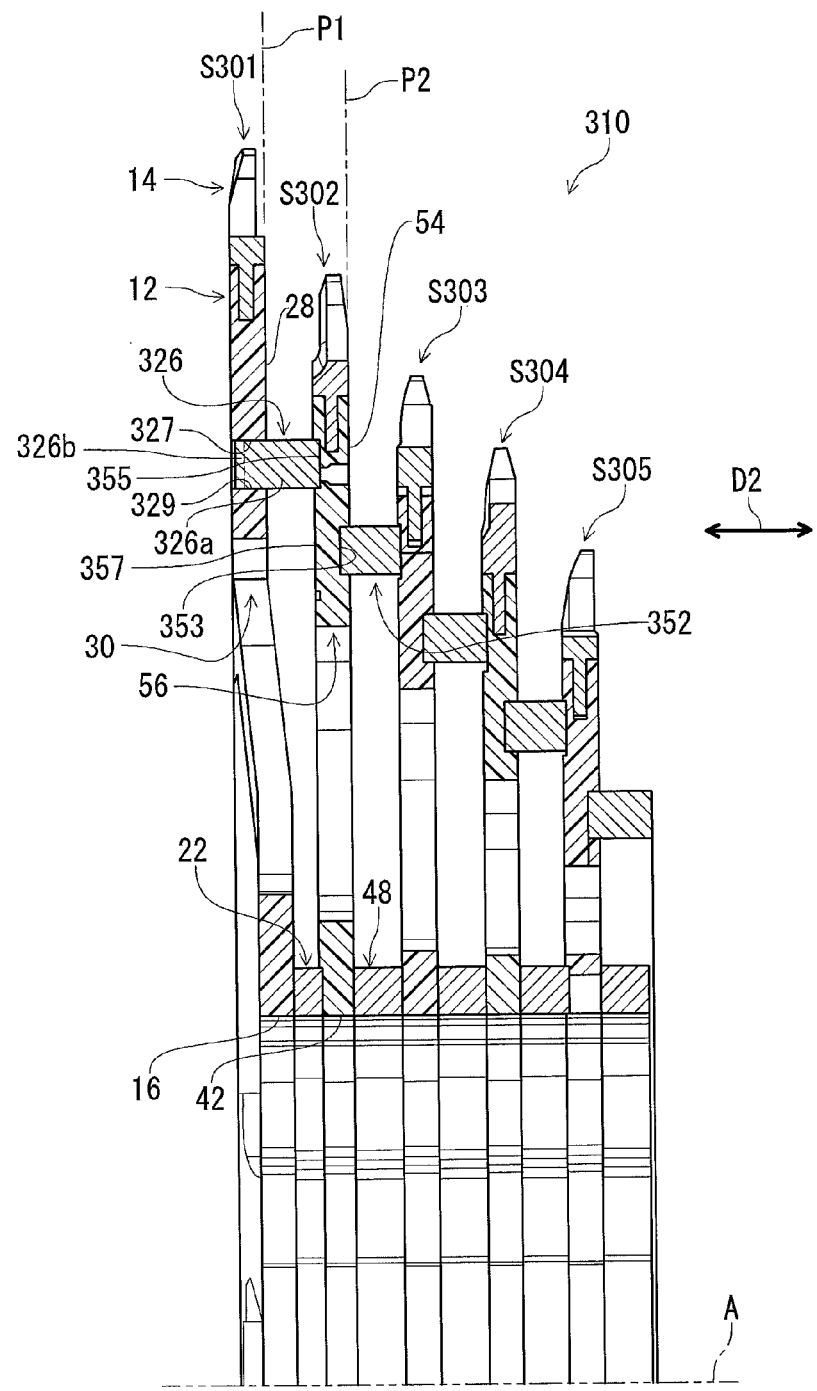
FIG. 16 is a partial cross-sectional view of the bicycle sprocket assembly taken along line XVI-XVI of FIG. 13.

As seen in FIGS. 15 and 16, the second intervening member 326 has an elongated shape extending along the first reference plane P1 (FIG. 16) perpendicular to the rotational center axis A. The second intervening member 326 has an elongated shape extending along the side surface 28 perpendicular to the rotational center axis A.

As seen in FIGS. 14 and 15, the first intervening member 22 has an annular shape and is disposed to be coaxial with respect to the rotational center axis A of the bicycle sprocket assembly 310. The second intervening member 326 has an annular shape and is disposed to be coaxial with respect to the rotational center axis A of the bicycle sprocket assembly 310. While the first intervening member 22 is a separate member from the second intervening member 326 in the illustrated embodiment, the first intervening member 22 can be integrally provided with the second intervening member 326 if needed and/or desired.

As seen in FIG. 16, the first intervening member 22 is positioned between the first sprocket S301 and the second sprocket S302 in the axial direction D2 parallel to the rotational center axis A. The second intervening member 326 is positioned between the first sprocket S301 and the second sprocket S302 in the axial direction D2. The first sprocket S301 is adjacent to the second sprocket S302 without another sprocket intervening between the first sprocket S301 and the second sprocket S302 in the axial direction D2. The second sprocket S302 is adjacent to the third sprocket S303 without another sprocket intervening between the second sprocket S302 and the third sprocket S303 in the axial direction D2. The second sprocket S302 is positioned between the first sprocket S301 and the third sprocket S303 in the axial direction D2.

The second intervening member 326 is attached to at least one of the first sprocket S301 and the second sprocket S302. The second intervening member 326 is attached to at least one of the first sprocket S301 and the second sprocket S302 by adhesive. In the illustrated embodiment, the second intervening member 326 is a separate member from the first sprocket S301 and the second sprocket S302. The second intervening member 326 is attached to the first sprocket S301 and the second sprocket S302. However, the second intervening member 326 can be integral with at least one of the first sprocket S301 and the second sprocket S302 as a single unitary member if needed and/or desired.

As seen in FIGS. 15 and 16, the first sprocket body 12 includes an attachment groove 327. The second intervening member 326 is provided in the attachment groove 327. The first sprocket body 12 includes attachment holes 329 provided in the attachment groove 327. The second intervening member 326 includes an annular body 326a and protrusions 326b protruding from the annular body 326a in the axial direction D2. The protrusions 326b are provided to mate with the attachment holes 329 respectively.

Figure 17:
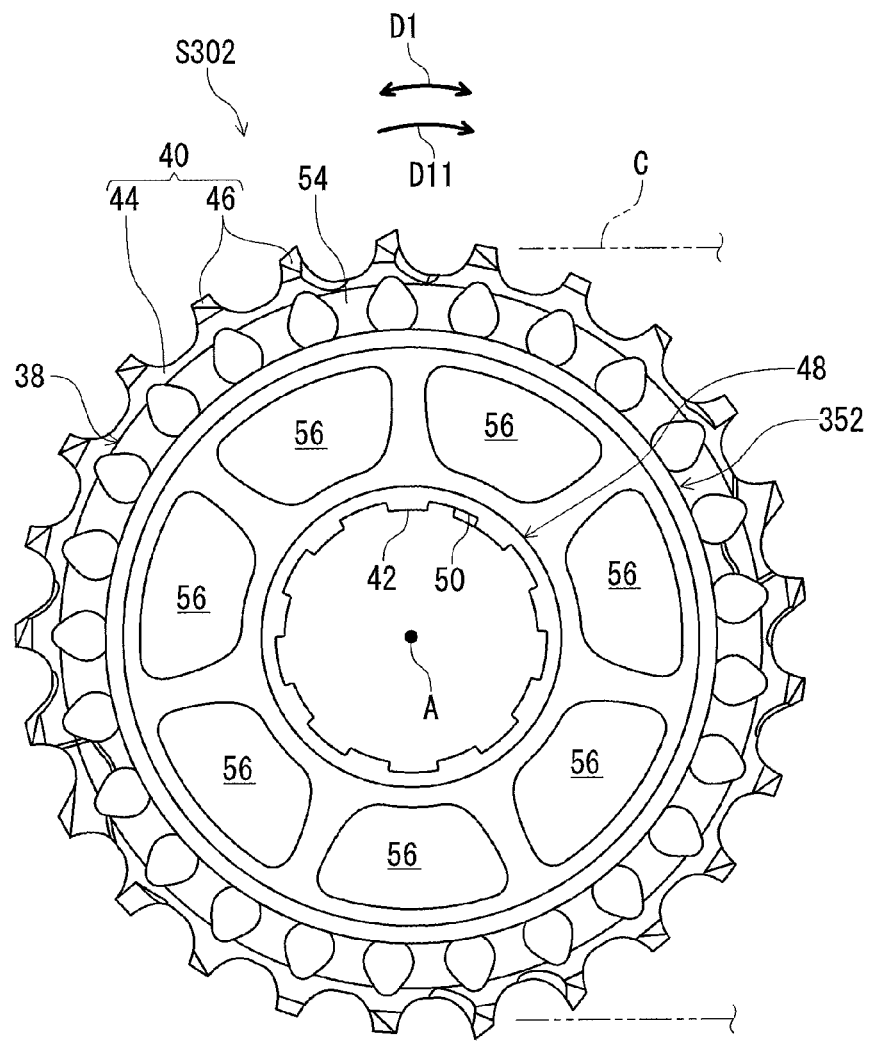
FIG. 17 is an elevational view of a second sprocket, a third intervening member and a fourth intervening member of the bicycle sprocket assembly illustrated in FIG. 13.
Figure 18:
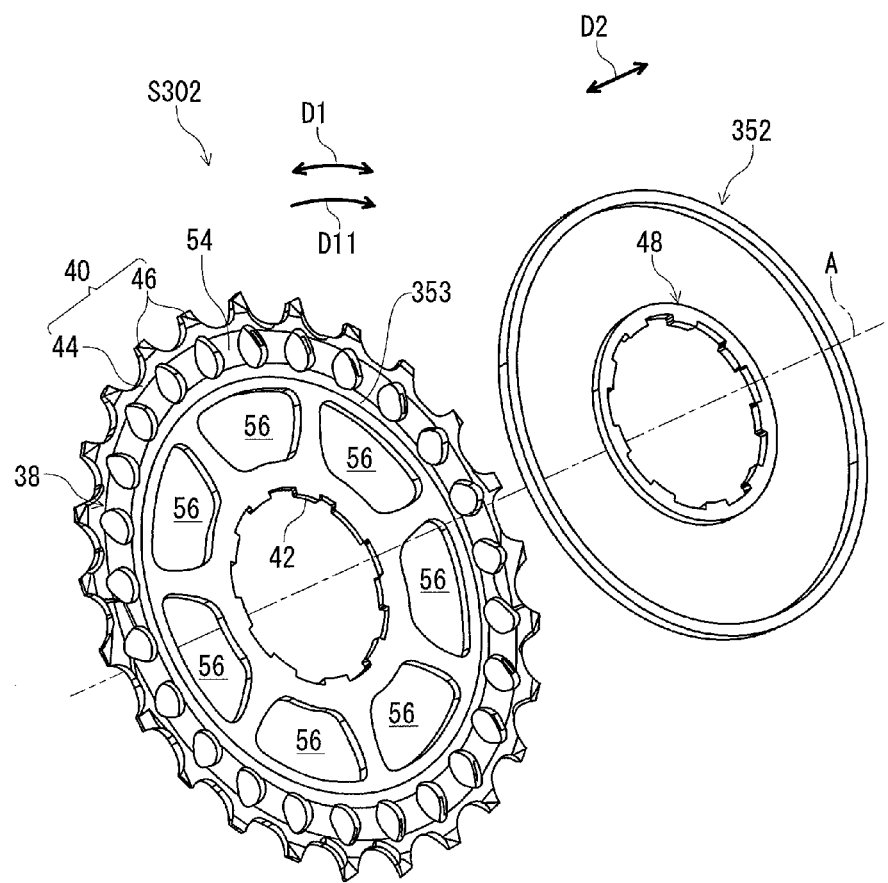
FIG. 18 is an exploded perspective view of the second sprocket, the third intervening member and the fourth intervening member of the bicycle sprocket assembly illustrated in FIG. 13.

As seen in FIGS. 17 and 18, the bicycle sprocket assembly 310 further comprises the third intervening member 48 and a fourth intervening member 352. The fourth intervening member 352 is provided radially outwardly from the third intervening member 48 with respect to the rotational center axis A. The third intervening member 48 and the fourth intervening member 352 are spaced apart from each other in the radial direction with respect to the rotational center axis A.

As seen in FIGS. 16 and 18, the fourth intervening member 352 has an elongated shape extending along the second reference plane P2 (FIG. 16) perpendicular to the rotational center axis A. The fourth intervening member 352 has an elongated shape extending along the side surface 54 perpendicular to the rotational center axis A.

As seen in FIG. 16, the third intervening member 48 is positioned between the second sprocket S302 and the third sprocket S303 in the axial direction D2. The fourth intervening member 352 is positioned between the second sprocket S302 and the third sprocket S303 in the axial direction D2. In the illustrated embodiment, the fourth intervening member 352 is positioned radially inwardly from the second intervening member 326 with respect to the rotational center axis A. The second intervening member 326 has an inner diameter larger than an outer diameter of the fourth intervening member 352. However, the fourth intervening member 352 can be positioned at the radial position equal to the second intervening member 326 or positioned radially outwardly from the second intervening member 326 with respect to the rotational center axis A if needed and/or desired.

In the illustrated embodiment, the third intervening member 48 is a separate member from the second sprocket S302 and the third sprocket S303. For example, the third intervening member 48 is attached to at least one of the second sprocket S302 and the third sprocket S303 by adhesive. However, the third intervening member 48 can be integrally provided with at least one of the second sprocket S302 and the third sprocket S303 if needed and/or desired. In the illustrated embodiment, the third intervening member 48 is attached to the second sprocket S302 and the third sprocket S303 by adhesive. However, the third intervening member 48 can be attached to at least one of the second sprocket S302 and the third sprocket S303 by other structures.

As seen in FIG. 16, the fourth intervening member 352 is attached to at least one of the second sprocket S302 and the third sprocket S303. The fourth intervening member 352 is attached to at least one of the second sprocket S302 and the third sprocket S303 by adhesive. The fourth intervening member 352 is attached to the second sprocket S302 and the third sprocket S303. In the illustrated embodiment, the fourth intervening member 352 is a separate member from the second sprocket S302 and the third sprocket S303. However, the fourth intervening member 352 can be integral with at least one of the second sprocket S302 and the third sprocket S303 if needed and/or desired.

As seen in FIGS. 16 and 18, while the third intervening member 48 is a separate member from the fourth intervening member 352 in the illustrated embodiment, the third intervening member 48 can be integrally provided with the fourth intervening member 352 if needed and/or desired.

Figure 19:
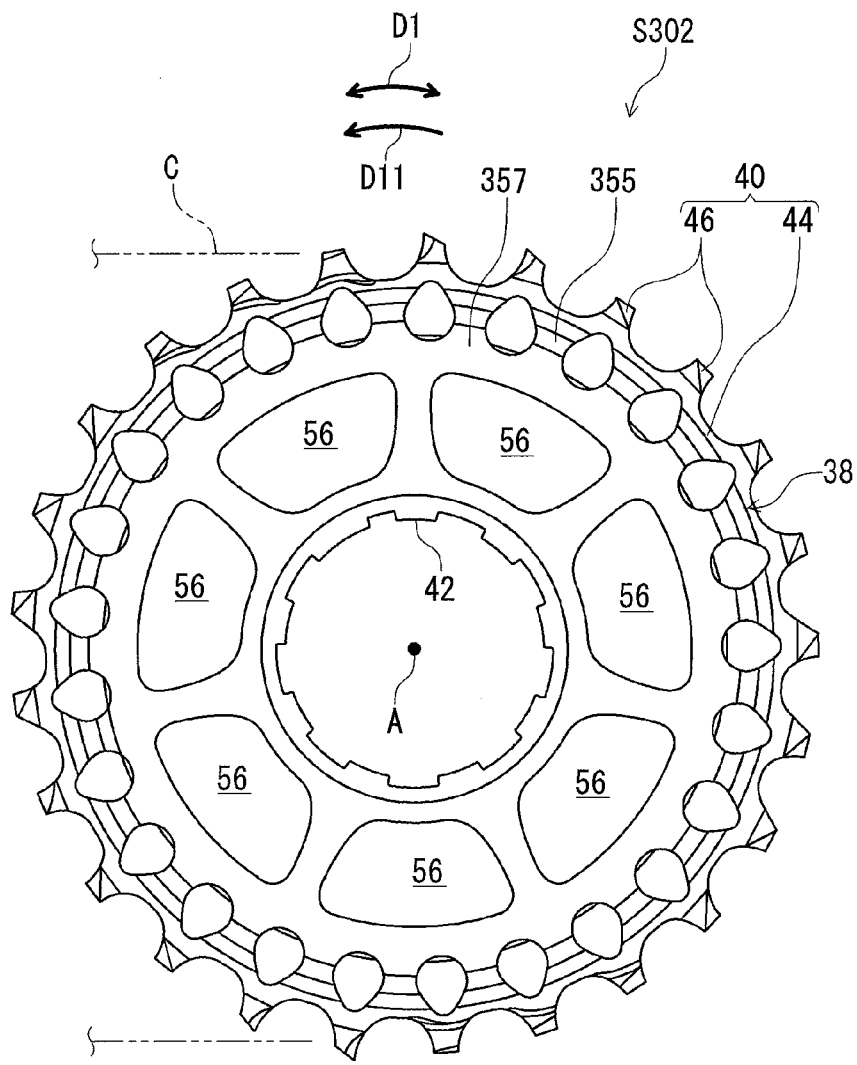
FIG. 19 is an elevational view of the second sprocket of the bicycle sprocket assembly illustrated in FIG. 13.

As seen in FIGS. 16 and 18, the second sprocket body 38 includes an attachment groove 353. The fourth intervening member 352 is provided in the attachment groove 353. As seen in FIG. 19, the second sprocket body 38 includes an additional attachment groove 355. The additional attachment groove 355 is provided on an additional side surface 357 opposite to the side surface 54 (FIG. 18) in the axial direction D2. As seen FIG. 16, the second intervening member 326 is provided in the additional attachment groove 355.

Since the third sprocket S303 and/or other sprockets has substantially the same structures as those of the second sprocket S302, they will not be described and/or illustrated in detail here for the sake of brevity.

With the bicycle sprocket assembly 310, it is possible to obtain substantially the same advantageous effect as that of the bicycle sprocket assembly 10 in accordance with the first embodiment.

Fourth Embodiment

A bicycle sprocket assembly 410 in accordance with a fourth embodiment will be described below referring to FIGS. 20 to 26. The bicycle sprocket assembly 410 has the same configuration as the bicycle sprocket assembly 10 except for sprocket bodies and intervening members. Thus, elements having substantially the same function as those in the above embodiments will be numbered the same here, and will not be described and/or illustrated again in detail here for the sake of brevity.

Figure 20:
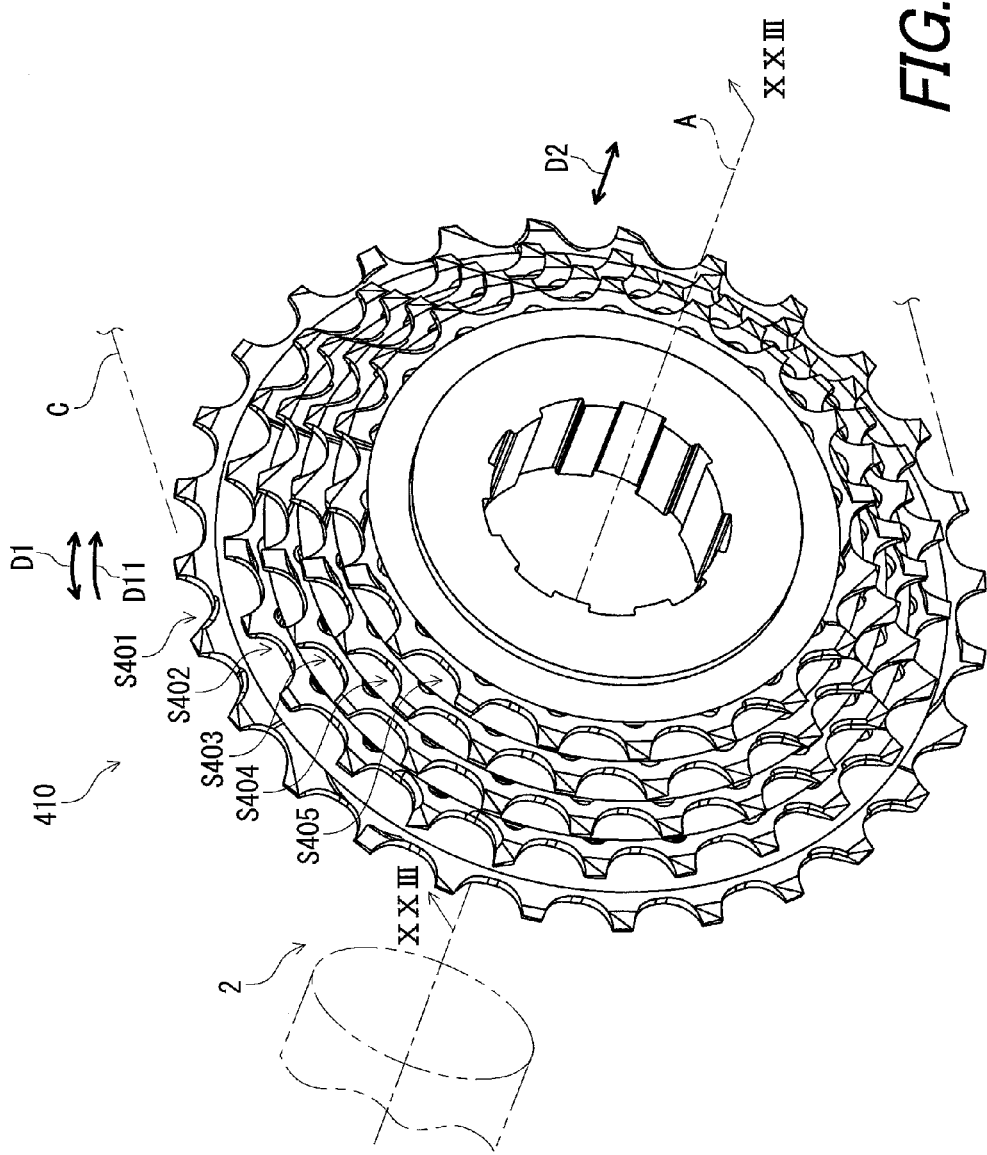
FIG. 20 is a perspective view of a bicycle sprocket assembly in accordance with a fourth embodiment.

As seen in FIG. 20, the bicycle sprocket assembly 410 is a bicycle rear sprocket assembly configured to engage with the bicycle chain C. The bicycle sprocket assembly 410 is also referred to as a bicycle rear sprocket assembly 410. In the illustrated embodiment, the bicycle rear sprocket assembly 410 comprises five bicycle sprockets S401 to S405. The bicycle rear sprocket assembly 410 has the rotational center axis A. The bicycle sprockets S401 to S405 are arranged in the axial direction D2 parallel to the rotational center axis A.

The bicycle rear sprocket assembly 410 comprises a first sprocket and a second sprocket. In the illustrated embodiment, the bicycle sprocket S401 is also referred to as the first sprocket S401, and the bicycle sprocket S402 is also referred to as the second sprocket S402. Other sprockets can be referred to as the first sprocket and the second sprocket if needed and/or desired.

Figure 21:
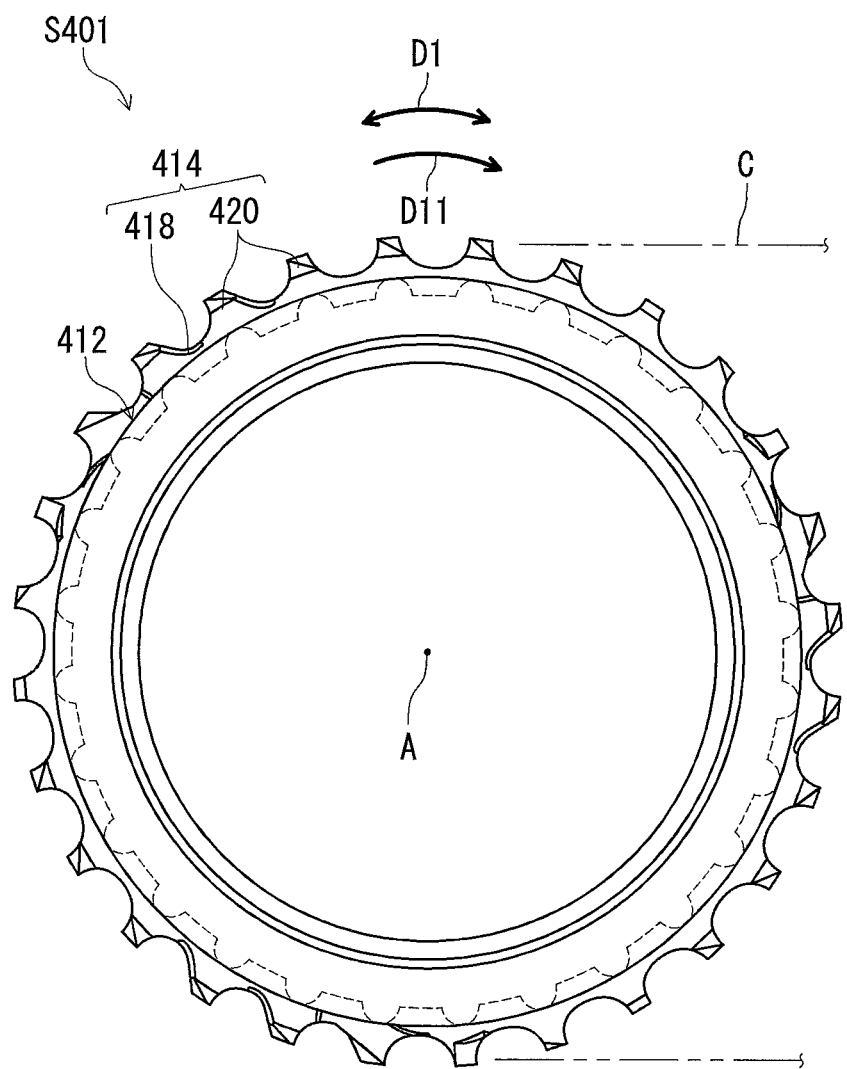
FIG. 21 is an elevational view of a first sprocket of the bicycle sprocket assembly illustrated in FIG. 20.

As seen in FIG. 21, the first sprocket S401 includes a first sprocket body 412 and a first chain-engagement structure 414. The first chain-engagement structure 414 is configured to engage with the bicycle chain C. The first chain-engagement structure 414 of the first sprocket S401 includes a first annular member 418 and a plurality of first teeth 420. The plurality of first teeth 420 are circumferentially arranged on an outer periphery of the first annular member 418.

The first sprocket body 412 is made of a non-metallic material. For example, the first sprocket body 412 is made of a resin material. The first chain-engagement structure 414 is made of a metallic material. The first annular member 418 is at least partly embedded in the first sprocket body 412. In the illustrated embodiment, the first annular member 418 is at least partly embedded in the first sprocket body 412 by integral molding. The first chain-engagement structure 414 is partly embedded in the first sprocket body 412 by integral molding such as insert molding. However, the first chain-engagement structure 414 can be attached to the first sprocket body 412 by adhesive if needed and/or desired.

Figure 22:
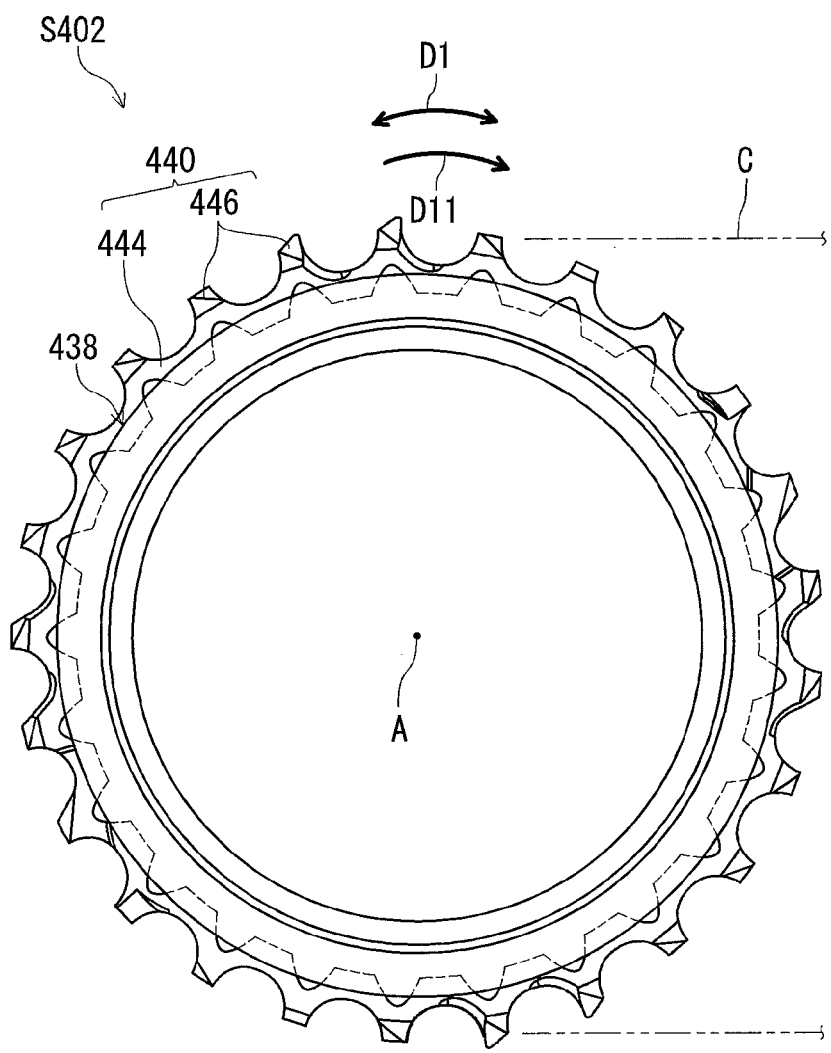
FIG. 22 is an elevational view of a second sprocket of the bicycle sprocket assembly illustrated in FIG. 20.

As seen in FIG. 22, the second sprocket S402 includes a second sprocket body 438 and a second chain-engagement structure 440. The second chain-engagement structure 440 is configured to engage with the bicycle chain C. The second chain-engagement structure 440 of the second sprocket S402 includes a second annular member 444 and a plurality of second teeth 446. The plurality of second teeth 446 are circumferentially arranged on an outer periphery of the second annular member 444.

Figure 23:
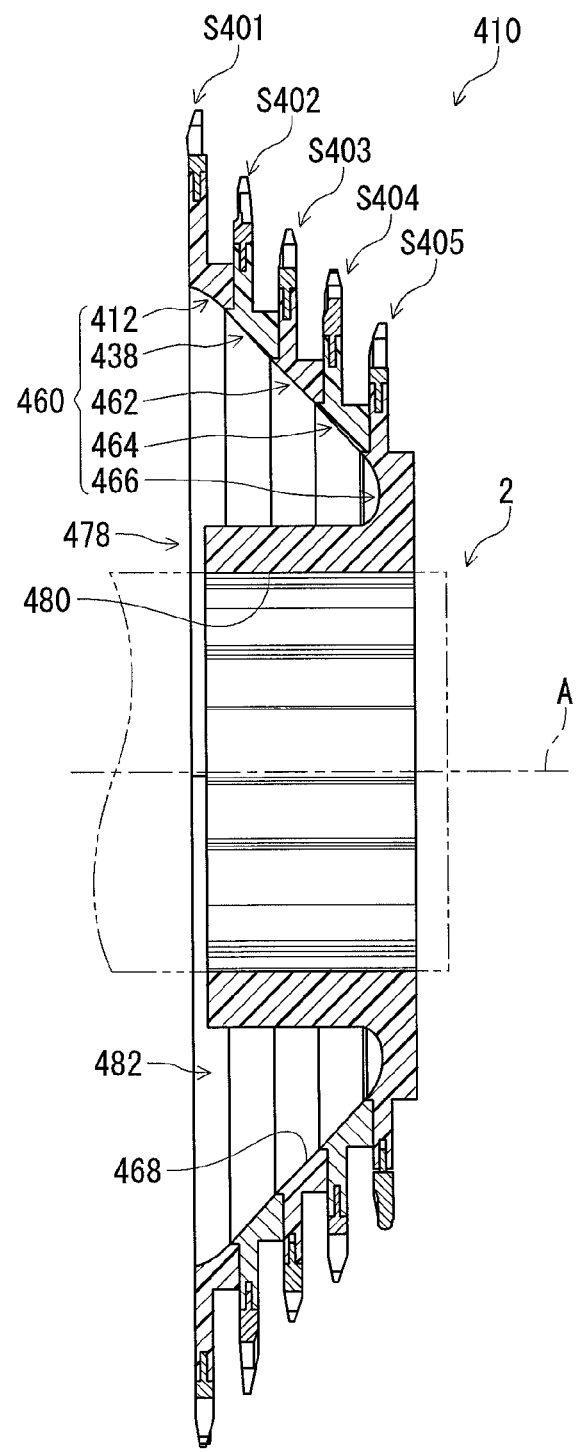
FIG. 23 is a partial cross-sectional view of the bicycle sprocket assembly taken along line XXIII-XXIII of FIG. 20.

The second sprocket body 438 is made of a non-metallic material. For example, the second sprocket body 438 is made of a resin material. The second sprocket body 438 is attached to the first sprocket body 412. In the illustrated embodiment, as seen in FIG. 23, the second sprocket body 438 is directly attached to the first sprocket body 412. However, the second sprocket body 438 can be attached to the first sprocket body 412 via an intervening member such as the first intervening member and the second intervening member in accordance with the above embodiments if needed and/or desired.

The second chain-engagement structure 440 is made of a metallic material. The second annular member 444 is at least partly embedded in the second sprocket body 438. In the illustrated embodiment, the second annular member 444 is at least partly embedded in the second sprocket body 438 by integral molding. The second chain-engagement structure 440 is partly embedded in the second sprocket body 438 by integral molding such as insert molding. However, the second chain-engagement structure 440 can be attached to the second sprocket body 438 by adhesive if needed and/or desired.

As seen in FIG. 23, the first sprocket body 412 and the second sprocket body 438 provide a base portion 460 having a truncated conical shape. In the illustrated embodiment, each of the bicycle sprockets S403 to S405 includes sprocket bodies 462, 464 and 466. The first sprocket body 412, the second sprocket body 438, and the sprocket bodies 462, 464 and 466 of the bicycle sprockets S401 to S405 provide the base portion 460 having a tapered inner peripheral surface 468.

Figure 24:
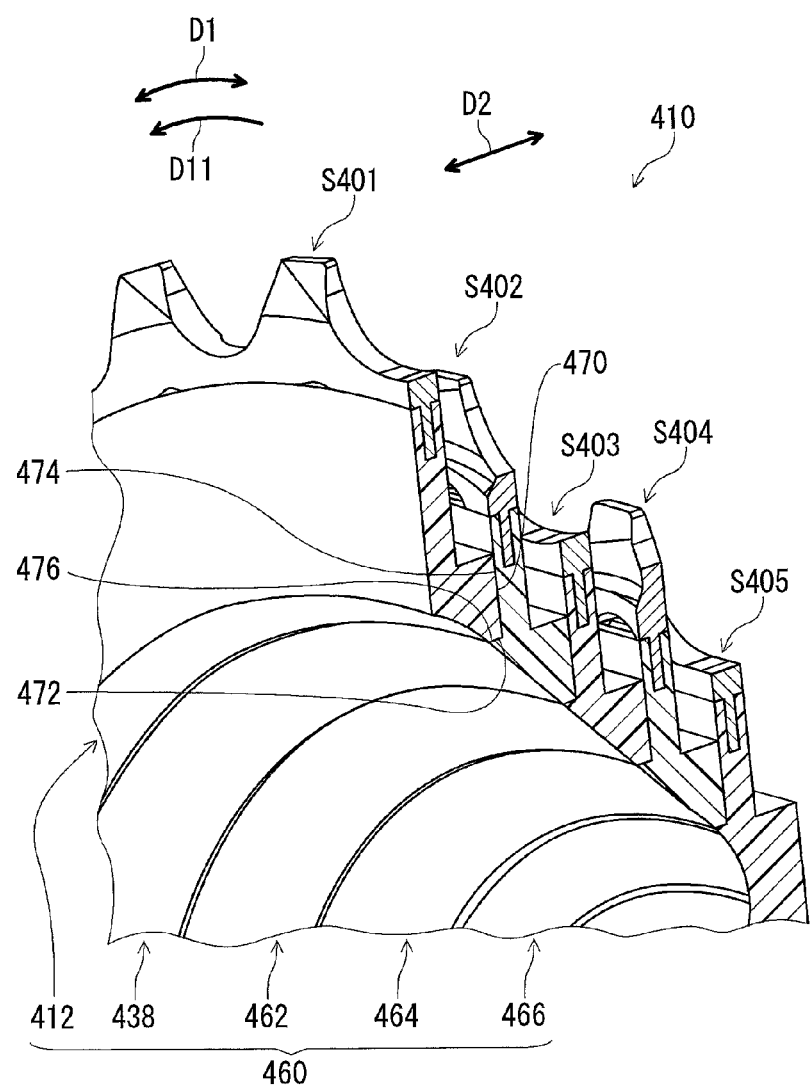
FIG. 24 is a partial perspective cross-sectional view of the bicycle sprocket assembly illustrated in FIG. 20.

As seen in FIG. 24, the first sprocket body 412 is attached to the second sprocket body 438 by adhesive. In the illustrated embodiment, the first sprocket body 412 is attached to the second sprocket body 438 through a concavo-convex structure for the purpose of better torque transmission. More specifically, the first sprocket body 412 includes a first axial surface 470 and a first radial surface 472. The first axial surface 470 has an annular shape and faces in the axial direction D2. The first radial surface 472 has an annular shape and radially inwardly faces relative to the rotational center axis A. The second sprocket body 438 includes a second axial surface 474 and a second radial surface 476. The second axial surface 474 has an annular shape and faces in the axial direction D2. The second radial surface 476 has an annular shape and radially outwardly faces relative to the rotational center axis A. The first axial surface 470 is attached to the second axial surface 474 by adhesive. The first radial surface 472 is attached to the second radial surface 476 by adhesive. For example, the concavo-convex structure may comprise a protrusion formed on one of the first axial surface 470 and the second axial surface 474, and a recess formed on the other of the first axial surface 470 and the second axial surface 474. Similarly, the concavo-convex structure may also comprise a protrusion formed on one of the first radial surface 472 and the second radial surface 476, and a recess formed on the other of the first radial surface 472 and the second radial surface 476. However, the concavo-convex structure can be omitted from the bicycle rear sprocket assembly 410 if needed and/or desired.

Figure 25:
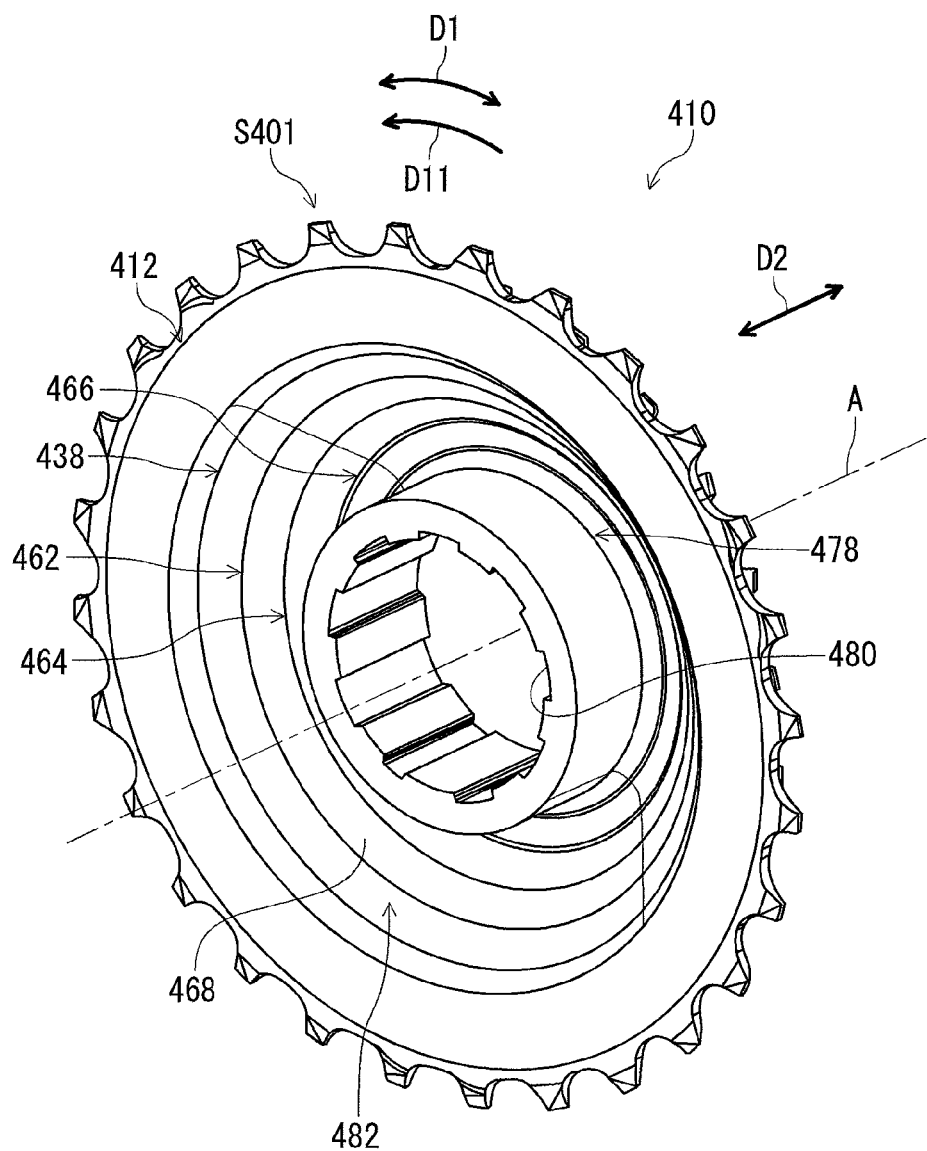
FIG. 25 is a perspective view of the bicycle sprocket assembly illustrated in FIG. 20.

As seen in FIGS. 23 and 25, the bicycle rear sprocket assembly 410 further comprises a tubular member 478 positioned coaxially with the rotational center axis A. The tubular member 478 has a hub engagement profile 480 configured to engage with the bicycle hub assembly 2 (FIG. 23). In the illustrated embodiment, the tubular member 478 is secured to the base portion 460. The tubular member 478 is integrally provided with the base portion 460 as a single unitary member. The tubular member 478 is integrally provided with the sprocket body 466 of the bicycle sprocket S405. However, the tubular member 478 can be a separate member from the base portion 460 if needed and/or desired.

As seen in FIGS. 23 and 25, the bicycle rear sprocket assembly 410 further comprises an internal space 482 provided between the base portion 460 and the tubular member 478 in a radial direction with respect to the rotational center axis A. In the illustrated embodiment, the tubular member 478 is spaced apart from the tapered inner peripheral surface 468 of the base portion 460 in the radial direction with respect to the rotational center axis A. The internal space 482 is provided between the tapered inner peripheral surface 468 and an outer peripheral surface of the tubular member 478.

With the bicycle rear sprocket assembly 410, the first sprocket body 412 is made of a non-metallic material. The second sprocket body 438 is made of a non-metallic material and is attached to the first sprocket body 412. In other words, the base portion 460 is made of a non-metallic material. Accordingly, it is possible to save weight of the bicycle rear sprocket assembly 410.

Figure 26:
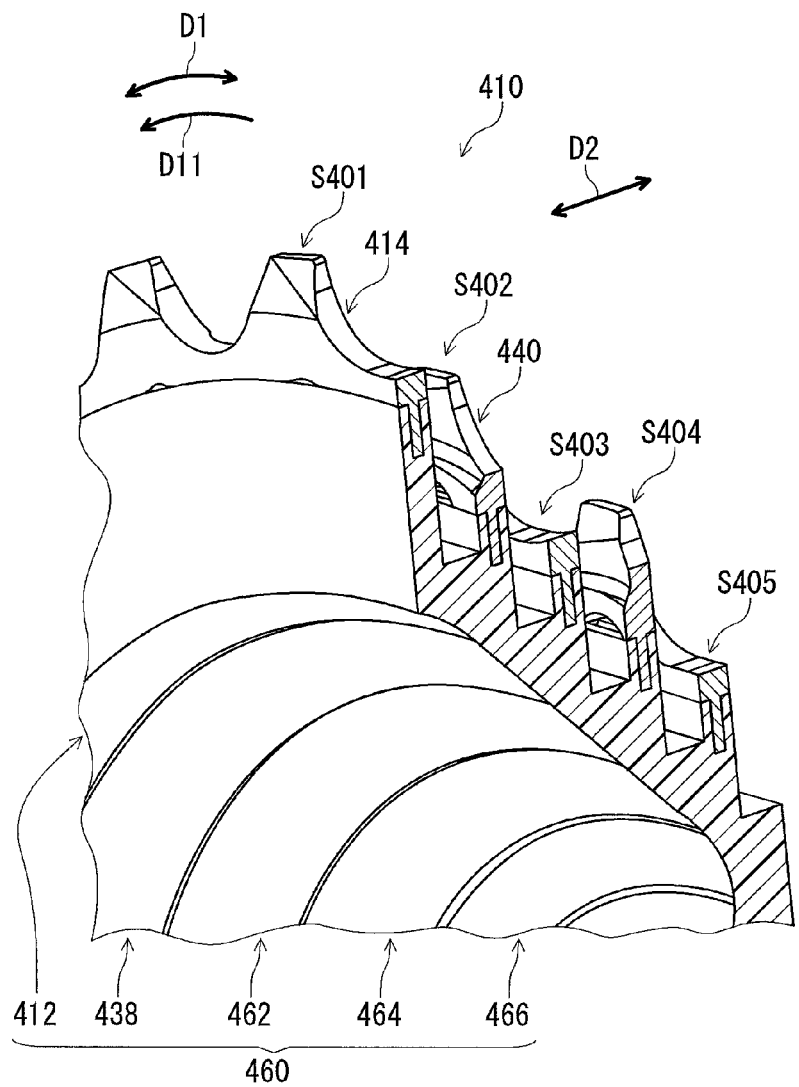
FIG. 26 is a partial perspective cross-sectional view of a bicycle sprocket assembly in accordance with a modified embodiment.

As seen in FIG. 26, the first sprocket body 412 and the second sprocket body 438 can be integral with each other as a single unitary member if needed and/or desired. In such an embodiment, the first chain-engagement structure 414 and the second chain-engagement structure 440 are at least partly embedded in the first sprocket body 412 and the second sprocket body 438 by integral molding such as insert molding. While the base portion 460 is integrally provided as a single unitary member in the illustrated embodiment, at least part of the base portion 460 can be a separate member from other part of the base member 460.

It will be apparent to those skilled in the bicycle field from the present disclosure that the constructions of the above embodiments can be at least partly combined with each other.

In the present application, the term "attached" or "attaching", as used herein, can encompass configurations in which an element is directly attached to the other element by affixing the element directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket assembly having a rotational center axis, the bicycle sprocket assembly comprising:
    a first sprocket including a first sprocket body and a first chain-engagement structure configured to engage with a bicycle chain, the first sprocket body having a first hub engagement profile configured to engage with a bicycle hub assembly;
    a second sprocket including a second sprocket body and a second chain-engagement structure configured to engage with the bicycle chain, the second sprocket body having a second hub engagement profile configured to engage with the bicycle hub assembly;
    a first intervening member positioned between the first sprocket and the second sprocket in an axial direction parallel to the rotational center axis; and
    a second intervening member positioned between the first sprocket and the second sprocket in the axial direction, the second intervening member being provided radially outwardly from the first intervening member with respect to the rotational center axis, the second intervening member being attached to at least one of the first sprocket and the second sprocket and having an elongated shape extending along a first reference plane perpendicular to the rotational center axis, the second intervening member including
        a radial thickness defined in a radial direction with respect to the rotational center axis, and
        a circumferential length defined in a circumferential direction of the bicycle sprocket assembly, the circumferential length being longer than the radial thickness to provide the elongated shape.

2. The bicycle sprocket assembly according to claim 1, wherein
    the first intervening member has an annular shape.

3. The bicycle sprocket assembly according to claim 1, wherein
    the first intervening member is a separate member from the second intervening member.

4. The bicycle sprocket assembly according to claim 1, wherein
    the first sprocket is adjacent to the second sprocket without another sprocket intervening between the first sprocket and the second sprocket in the axial direction.

5. The bicycle sprocket assembly according to claim 1, wherein
    the first intervening member has a hub engagement profile configured to engage with the bicycle hub assembly.

6. The bicycle sprocket assembly according to claim 1, wherein
    the first intervening member and the second intervening member are spaced apart from each other in a radial direction with respect to the rotational center axis.

7. The bicycle sprocket assembly according to claim 1, wherein
    the first intervening member is attached to at least one of the first sprocket and the second sprocket by adhesive, and
    the second intervening member is attached to at least one of the first sprocket and the second sprocket by adhesive.

8. The bicycle sprocket assembly according to claim 1, wherein
    the first intervening member is attached to at least one of the first sprocket and the second sprocket by diffusion bonding, and
    the second intervening member is attached to at least one of the first sprocket and the second sprocket by diffusion bonding.

9. The bicycle sprocket assembly according to claim 1, wherein
    the first chain-engagement structure includes a plurality of first teeth having a first total number,
    the second chain-engagement structure includes a plurality of second teeth having a second total number, and
    the first total number is larger than the second total number.

10. The bicycle sprocket assembly according to claim 1, wherein
    the first chain-engagement structure includes
        a first annular member, and
        a plurality of first teeth circumferentially arranged on an outer periphery of the first annular member,
    the first annular member and the plurality of first teeth are made of a metallic material, and
    the first sprocket body is made of a non-metallic material.

11. The bicycle sprocket assembly according to claim 10, wherein
    the first sprocket body is made of a resin material.

12. The bicycle sprocket assembly according to claim 10, wherein
    the first annular member is attached to the first sprocket body by integral molding.

13. The bicycle sprocket assembly according to claim 10, wherein
    the first annular member is attached to the first sprocket body by adhesive.

14. The bicycle sprocket assembly according to claim 1, wherein
    the second intervening member is integral with one of the first sprocket and the second sprocket as a single unitary member.

15. The bicycle sprocket assembly according to claim 1, wherein
    the second intervening member is attached to the first sprocket and the second sprocket.

16. The bicycle sprocket assembly according to claim 1, further comprising:
    a third sprocket including a third sprocket body and a third chain-engagement structure configured to engage with the bicycle chain, the third sprocket body having a third hub engagement profile configured to engage with the bicycle hub assembly, the second sprocket being positioned between the first sprocket and the third sprocket in the axial direction;

a third intervening member positioned between the second sprocket and the third sprocket in the axial direction; and a fourth intervening member positioned between the second sprocket and the third sprocket in the axial direction, the fourth intervening member being provided radially outwardly from the third intervening member with respect to the rotational center axis, wherein the fourth intervening member is attached to at least one of the second sprocket and the third sprocket.

17. The bicycle sprocket assembly according to claim 16, wherein the fourth intervening member having an elongated shape extending along a second reference plane perpendicular to the rotational center axis.

18. The bicycle sprocket assembly according to claim 16, wherein the third intervening member has an annular shape.

19. The bicycle sprocket assembly according to claim 16, wherein the third intervening member is a separate member from the fourth intervening member.

20. The bicycle sprocket assembly according to claim 16, wherein the second sprocket is adjacent to the third sprocket without another sprocket intervening between the second sprocket and the third sprocket in the axial direction.

21. The bicycle sprocket assembly according to claim 16, wherein the fourth intervening member is attached to the second sprocket and the third sprocket.

22. The bicycle sprocket assembly according to claim 16, wherein the third intervening member has a hub engagement profile configured to engage with the bicycle hub assembly.

23. The bicycle sprocket assembly according to claim 16, wherein the third intervening member and the fourth intervening member are spaced apart from each other in a radial direction with respect to the rotational center axis.

24. The bicycle sprocket assembly according to claim 16, wherein the fourth intervening member is positioned radially inwardly from the second intervening member with respect to the rotational center axis.

25. The bicycle sprocket assembly according to claim 16, wherein the third intervening member is attached to at least one of the second sprocket and the third sprocket by adhesive, and the fourth intervening member is attached to at least one of the second sprocket and the third sprocket by adhesive.

26. The bicycle sprocket assembly according to claim 16, wherein the third intervening member is attached to at least one of the second sprocket and the third sprocket by diffusion bonding, and the fourth intervening member is attached to at least one of the second sprocket and the third sprocket by diffusion bonding.

27. The bicycle sprocket assembly according to claim 1, wherein the first intervening member has an annular shape and is disposed to be coaxial with respect to the rotational center axis of the bicycle sprocket assembly.

28. The bicycle sprocket assembly according to claim 27, wherein the second intervening member has an annular shape and is disposed to be coaxial with respect to the rotational center axis of the bicycle sprocket assembly.

29. The bicycle sprocket assembly according to claim 1, wherein the first sprocket has
 a first opening provided on the first sprocket body, and
 a first inner periphery defining the first opening, and the second intervening member includes a first elongated portion at least partly extending along the first inner periphery.

30. The bicycle sprocket assembly according to claim 1, wherein the first sprocket has
 first openings provided on the first sprocket body, and
 first inner peripheries respectively defining the first openings, and the second intervening member includes
 first elongated portions each at least partly extending along one of the first inner peripheries, and
 first additional elongated portions each at least partly extending along another of the first inner peripheries which is adjacent to the one of the first inner peripheries.

31. The bicycle sprocket assembly according to claim 29, further comprising:

a third sprocket including a third sprocket body and a third chain-engagement structure configured to engage with the bicycle chain, the third sprocket body having a third hub engagement profile configured to engage with the bicycle hub assembly, the second sprocket being positioned between the first sprocket and the third sprocket in the axial direction;

a third intervening member positioned between the second sprocket and the third sprocket in the axial direction; and a fourth intervening member positioned between the second sprocket and the third sprocket in the axial direction, the fourth intervening member being provided radially outwardly from the third intervening member with respect to the rotational center axis, wherein the fourth intervening member is attached to at least one of the second sprocket and the third sprocket, the second sprocket has
 a second opening provided on the second sprocket body, and
 a second inner periphery defining the second opening, the first opening is aligned with the second opening in the axial direction, and the fourth intervening member includes a second elongated portion at least partly extending the second inner periphery.

32. The bicycle sprocket assembly according to claim 30, further comprising:

a third sprocket including a third sprocket body and a third chain-engagement structure configured to engage with the bicycle chain, the third sprocket body having a third hub engagement profile configured to engage with the bicycle hub assembly, the second sprocket being positioned between the first sprocket and the third sprocket in the axial direction;

a third intervening member positioned between the second sprocket and the third sprocket in the axial direction; and a fourth intervening member positioned between the second sprocket and the third sprocket in the axial direction, the fourth intervening member being provided radially outwardly from the third intervening member with respect to the rotational center axis, wherein the fourth intervening member is attached to at least one of the second sprocket and the third sprocket, the second sprocket has second openings provided on the second sprocket body, and second inner peripheries respectively defining the second opening, and the fourth intervening member includes second elongated portions each at least partly extending along one of the second inner peripheries, and second additional elongated portions each at least partly extending along another of the second inner peripheries which is adjacent to the one of the second inner peripheries.

33. The bicycle sprocket assembly according to claim 29, wherein the first elongated portion has the radial thickness and the circumferential length.

34. The bicycle sprocket assembly according to claim 30, wherein each of the first elongated portions has the radial thickness and the circumferential length.

35. The bicycle sprocket assembly according to claim 31, wherein the second elongated portion has the radial thickness and the circumferential length.

36. The bicycle sprocket assembly according to claim 32, wherein each of the second elongated portions has the radial thickness and the circumferential length.

37. The bicycle sprocket assembly according to claim 1, wherein the first sprocket includes a center opening and a first opening provided radially outward of the center opening, and the second intervening member is at least partly provided radially outward of the first opening.

* * * * *